(12) United States Patent
Stone

(10) Patent No.: US 10,596,644 B2
(45) Date of Patent: Mar. 24, 2020

(54) PANEL SAW AND METHOD OF OPERATION

(71) Applicant: Paul R. Stone, Federal Way, WA (US)

(72) Inventor: Paul R. Stone, Federal Way, WA (US)

(*) Notice: Subject to any disclaimer, the term of this patent is extended or adjusted under 35 U.S.C. 154(b) by 0 days.

(21) Appl. No.: 15/646,068

(22) Filed: Jul. 10, 2017

(65) Prior Publication Data

US 2017/0368620 A1 Dec. 28, 2017

Related U.S. Application Data

(62) Division of application No. 13/707,585, filed on Dec. 6, 2012, now abandoned.

(60) Provisional application No. 61/567,304, filed on Dec. 6, 2011.

(51) Int. Cl.
*B23D 47/02* (2006.01)
*B23D 45/02* (2006.01)
*B27B 5/07* (2006.01)

(52) U.S. Cl.
CPC ............ *B23D 47/02* (2013.01); *B23D 45/021* (2013.01); *B27B 5/07* (2013.01); *Y10T 83/05* (2015.04); *Y10T 83/8763* (2015.04)

(58) Field of Classification Search
CPC ........ B23D 47/02; B23D 45/021; B28D 1/04; B27B 5/07
USPC ............ 125/12, 13.01, 13.03, 14, 16.03, 17; 144/286; 83/574, 483, 485, 651, 859, 83/745, 743, 821–826
See application file for complete search history.

(56) References Cited

U.S. PATENT DOCUMENTS

| | | | | |
|---|---|---|---|---|
| 5,165,317 A | * | 11/1992 | Findlay | B23D 45/024 144/253.1 |
| 5,473,968 A | * | 12/1995 | Break | B23D 47/025 144/286.5 |
| 2010/0024621 A1 | * | 2/2010 | Van Cleave | B23D 47/02 83/471.2 |
| 2012/0285305 A1 | * | 11/2012 | Jablonsky | B23D 51/02 83/56 |

* cited by examiner

*Primary Examiner* — Ghassem Alie
*Assistant Examiner* — Nhat Chieu Q Do
(74) *Attorney, Agent, or Firm* — Long & Chybik; John D. Long, Esq.

(57) ABSTRACT

The invention is a method for operating a panel saw of a framework supporting a set of beveled railings, the railings being held in a parallel and spaced apart orientation to one another and to the framework; a carriage having at least two pairs of opposing beveled carriage side edges and at least one tool securing apparatus, one pair of opposing carriage side edges reversibly removably engages the set of railings to movably locate the carriage between the set of railings; wherein the carriage moves in and out of contact with the railings through the top ends of the railings to allow the one pair of carriage side edges to be moved out of contact with the set of railings while alternately allowing the remaining pair to reversibly engage the set of railings in a manner that lets permits the carriage move along the railings in a self-centering manner.

16 Claims, 17 Drawing Sheets

PANEL SAW AND METHOD OF OPERATION

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention generally relates to panel saws and their methods of operation. More particularity to those panel saws and respective methods of operation that may substantially employ a mounting capability that allows a carriage, supporting a power tool, to be removed from a linear guide and then be replaced upon a linear guide in manner that changes the orientation of the power tool relative to the linear guide.

BACKGROUND

In various commercial and home-based DIY (Do-It-Yourself) construction/manufacturing concerns, there may arise a need to cut large sheets of material into smaller panels of specific shapes and dimensions. Typical sheet materials may include wood, wood composition material (e.g., plywood), melamine (e.g., for carpentry, cabinetry, furniture manufacture, etc.), aluminum, plastic (for the signage construction) and the like. Generally, the size of these sheets prohibit the use of readily available and inexpensive table saws and require instead the less readily available and more expensive panel saws.

Panel saws may come in two frame orientations: vertical panel saw and the horizontal panel saw. The vertical panel being the larger of the two panel saws may offer greater cutting capability and versatility. The panel saws may also varying in expense, complexity, capability; ranging from costly CNC controlled types to less expense manually adjusted panel saws. Generally, usage, space limitation, and monetary concerns determine the selection of the type of panel saw.

Panel saws may comprise a framework, a linear guide, a carriage, and a cutting tool that is powered like a circular saw or router or that is manually operated like a knife. The linear guide (e.g., a pair of parallel, spaced-apart railings) could be attached at the framework's top and bottom edges. This placement could substantially provide for a space between the linear guide and front side of the framework through which the material to be cut could pass to come into contact with the cutting tool. The linear guide's placement upon the framework could further place the railings to be generally perpendicular with respect to the bottom edge of the framework generally bisecting the framework.

The carriage could be movably mounted to the linear guide utilizing bearings that ride upon the railings so as to generally locate the carriage between the railing pair. The cutting tool could be mounted on the carriage to allow a cutting surface or element of the cutting tool to be placed between the railing pair as well. The resulting carriage and tool combination could then move freely along the length of the linear guide and cut across the width (e.g., height) of the framework, unless locked into place at a desired height on the guide. Some versions of the carriage may further provide for a rotation of the cutting tool within the carriage to orient the cutting tool for use when the carriage is moved down along the guide or when the carriage is fixed at a point on the guide (and to allow the material to be cut to be fed into the cutting tool.) By adjusting the orientation of the cutting tool (e.g., powered circular saw) within the carriage, the cutting tool may provide two kinds of cuts: cross cuts (e.g., vertical/widthwise cuts) or rip cuts (e.g., horizontal/lengthwise cuts.)

For example, when the rip cut is desired, the carriage and tool combination could be fixed at a certain position on the linear guide (e.g., at the height on the linear guide where the rip cut will occur on the material to be cut being inserted into the framework) and with the orientation of the cutting surface or element (e.g., saw blade) being parallel to the bottom edge of the framework (e.g., perpendicular to the railings of the linear guide.) When the tool is activated, the operator could feed a sheet of material to be cut into the framework. This feeding action could result in the material being moved into the powered saw at a fixed height to allow the saw blade to impart a rip cut (e.g., a horizontal cut at a constant height) in the material to be cut.

If on the other hand, the cross cut is desired, then the cutting surface or element could be oriented perpendicular to the bottom edge of framework (e.g., parallel to the railings of the linear guide) with the carriage and tool combination being raised up to the top of the linear guide to generally clear any material to be cut that may be loaded or moved into the power saw. As the operator places material to be cut into the framework and the portion of material to be cut is between the linear guides and the frame work, the operator can lock the portion in place relative to the framework. As power is applied to the cutting tool, the operator could move the carriage along the linear guide to allow the cutting tool to vertically engage the material to be cut as fixed proximate to the framework.

One of the possible drawbacks for a panel saw could be the panel saw's expense. Even a simple vertical panel saw may cost in the order of thousands of dollars. Many small manufacturing concerns and home-based DIY enthusiasts, in order to obtain a manual horizontal panel saw for a price they can afford, attempt to make their own panel saw by building the framework, linear guides, carriage to incorporate a cutting tool (e.g., circular power saw) to make their own horizontal panel saw. While a framework may be inexpensively constructed from easily available materials, there may be greater difficulties in building vertical linear guides, carriage system or both.

One expense of a linear guide could be a bearing system interface used to connect the carriage to the linear guide. Such bearing system interfaces may be required to translate the cutting movement of the assembly of the carriage and cutting tool relative to the linear guide into a smooth and controllable movement. The use of round cross-section railings and pass-through bearings in the panel saw may result in the carriage (and hence the cutting tool) to be substantially captive to the linear guide and generally allowing the removal of the carriage from the linear guides only with extensive disassembly. This limitation, in making it more difficult to switch out tools from the panel saw, may generally require a non-inexpensive, dedicated power cutting tool to generally be permanently attached to the carriage (and the linear guide.) The use of a captive carriage may also lead to complex assemblies needed to rotate the cutting tool to change cutting tool's orientation of the cutting tool's action relative to the linear guide and the framework. The usage of round cross-section railings and pass-through bearings may further increase the distance between the material being cut and cutting tool (e.g., generally reducing the depth of cut.)

What could be needed is an easily and an inexpensively built vertical panel saw that could incorporate a simple linear guide with a corresponding inexpensive and easy-to-fabricate, bearing-less carriage. It could be desirable to have the carriage to be able to removably interlock or engage the linear guide and then move the carriage together with the removably attached cutting tool along the linear guide to the region where the cutting tool then engages the material to be cut or work piece being held by the panel saw. The carriage, in being non-captive and be easily removed from the linear guide, could allow the assembly of carriage and cutting tool to be removed from the linear guide; be rotated and be reinserted into the linear guide to reorient the assembly of carriage and cutting tool as needed for a desired action. Further, the carriage could be inexpensively fabricated (e.g., various types of cutting tools, such as a circular saw, router, jig saw, knife, etc., could have their own dedicated carriage if desired) generally allowing a carriage (with one type of cutting tool) to be easily taken out of the linear guide and replaced with another carriage attached to another type of cutting tool.

The invention could also provide the carriage with its own reversible mounting capability for the respective cutting tool. Such a carriage could easily be constructed to removably mount various makes and manufactures of one type of commercially-available, non-dedicated, hand-held powered cutting tool. This mounting capability could allow an operator to use a cutting tool already in the operator's possession, rather than procure a specific manufacture of cutting tool for dedicated use in the panel saw. Further, by having the ability to easily reversibly mount the cutting power tool to the carriage, the cutting tool can be removed from the panel saw and be committed to non-panel saw uses when the panel saw is not in operation.

SUMMARY OF ONE EMBODIMENT OF THE INVENTION

Advantages of One or More Embodiments of the Present Invention

The various embodiments of the present invention may, but do not necessarily, achieve one or more of the following advantages:

to provide a panel saw that could be easily and inexpensively assembled from readily available parts;

the ability of a panel saw to have a carriage move along the length of the linear guide without the use of bearing interface; the carriage itself becoming the bearing, being made from a compatible low friction material;

to provide a panel saw that can reversibly integrate into the panel saw's operations a number of different makes and manufactures of one type of cutting tool;

the ability of a panel saw to removably integrate into the panel saw'sits operations different types of cutting tools;

to provide a panel saw that can removably integrate a commercially available, hand-held, power cutting tool with the panel saw, the cutting tool being easily removed from the panel saw when the panel saw is not in use and to be used for various non-panel saw tasks;

to provide a panel saw whose linear guide and carriage combination allows for easy removal and replacement of the carriage relative to the linear guide;

the ability for the easy removal and replacement of a carriage relative to the linear guide for a panel saw to allow for easy reorientation of the cutting tool for panel saw operations;

to provide for a panel saw whose linear guide and carriage combination allows for easy removal from the linear guide of a first carriage having one kind of cutting substitution upon the linear guide of another of the same type carriage bearing another kind of cutting tool;

the ability to use railings with an open-sided channels to form a linear guide for the panel saw that can hold the carriage closer to the framework without moving the linear guide closer to the framework;

provide a panel saw linear guide whose railings have open-sided channels that movable engage edges of a carriage to movably hold the carriage between railings; and the ability to have a panel saw carriage having at least one open-sided channel that moves along an edge provided by a railing of a linear guide.

These and other advantages may be realized by reference to the remaining portions of the specification, claims, and abstract.

BRIEF DESCRIPTION OF ONE EMBODIMENT OF THE PRESENT INVENTION

One possible embodiment of the invention could be a vertical panel saw comprising a framework supporting a set of railings, the railings being held in a parallel and spaced apart orientation to one another and to the framework; a carriage having at least two pairs of opposing carriage side edges and at least one tool securing means for securing a power tool to the carriage, one pair of the at least two pairs of opposing carriage side edges reversibly engages the set of railings to movably locate the carriage between the set of railings to allow the carriage to move along the railings; wherein the carriage moves in and out of contact with the railings through the top ends of the railings to allow the one pair of the at least two pairs of carriage side edges to be moved out of contact with the set of railings while alternately allowing the remaining pair of opposing carriage side edges to reversibly engage the set of railings in a manner that lets the carriage move along the railings.

Another possible embodiment of the invention could be a method of operating a vertical panel saw comprising of the following steps: providing a vertical panel saw, the vertical panel saw comprising a framework and a carriage, the framework supporting a set of railings, the railings being held in a parallel and spaced apart orientation to one another and to the framework, the carriage having at least two pairs of opposing carriage side edges, the opposing carriage side edges of one pair being perpendicularly oriented relative to the opposing carriage side edges of the remaining pair, the carriage capable of supporting a power tool, one pair of the at least two pairs opposing carriage side edges movably engages the set of railings to allow the carriage to move between and along the railings; removing the one pair of the at least two pairs of opposing carriage side edges from engagement with the set of railings through top ends of the set of railings; and engaging the remaining pair of the at least two pairs of opposing carriage side edges with the set of railings through top ends of the set of railings.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
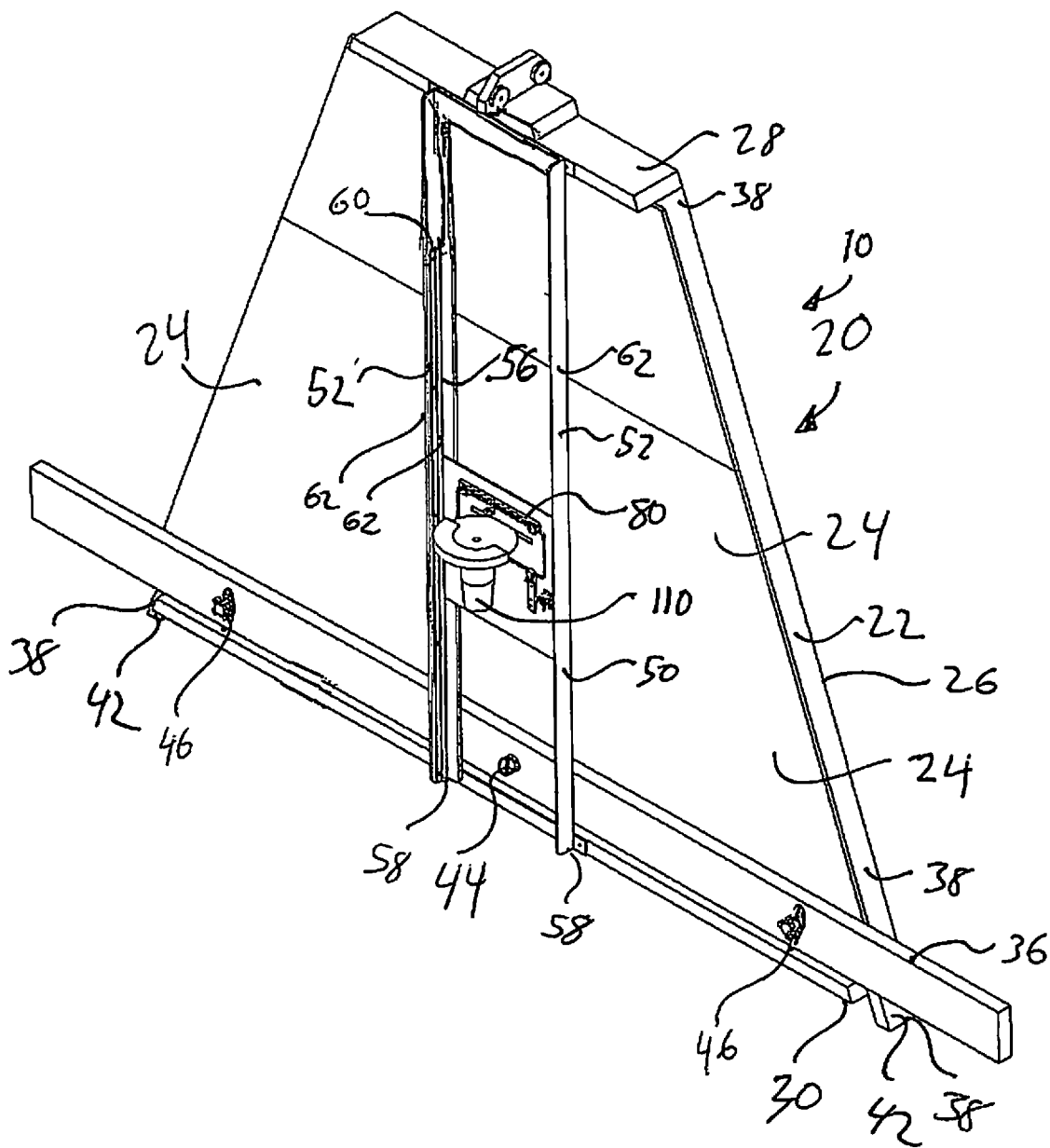
FIG. 1 is substantially a perspective view of one embodiment of the present invention.
Figure 2:
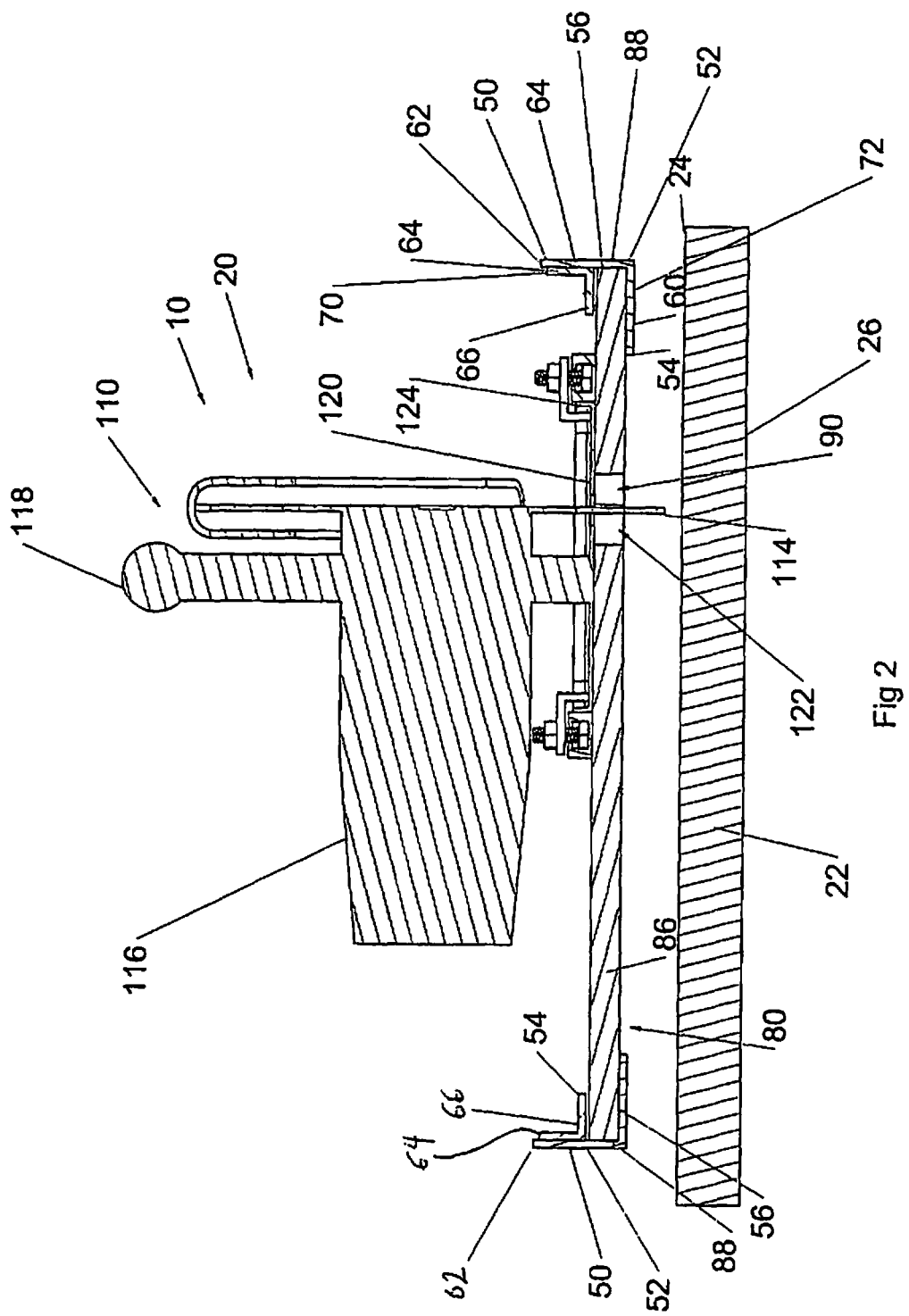
FIG. 2 is substantially a cross section view of one embodiment of the present invention.

The present invention 10 could comprise a vertical panel saw 20 and a process or method 300 for its operation. As substantially shown in FIG. 1, the panel saw 20 could comprise a framework 22, a linear guide 50, and a carriage 80, and a cutting tool 110 (e.g., a circular saw 112.) The framework 22 could support the linear guide 50 away from, yet parallel to a front side 24 of the framework 22. The carriage 80 could reversibly and movably engage the linear guide 50, allowing the carriage 80 to move along the length of the linear guide 50. The carriage 80 could further be configured to reversibly accept and mount a non-dedicated, hand-held cutting tool 110.

The framework 22, having a wide variety of configurations, could substantially support the linear guide 50 and have the further capacity to support a side of material to be cut (not shown) as the material to be cut is placed between the framework 22 and the linear guide 50. The framework 22 could have a planar front side 24 and a back side 26.

The two sides 24, 26 being connected to one another by a top edge 28, bottom edges 30 and side edges. In one embodiment, the shape of framework 32 could be trapezoidal and could be comprise a wooden frame 38 attached to a sheet (e.g., of plywood or other suitable construction material) to respectively form the front side 24 with an open back side 26.

The framework 22 could further comprise a sliding means (e.g., for supporting or allowing the movement of a bottom edge of material placed in the vertical panel saw 20) or a fence 36 and a base means 38 (e.g., for holding the framework 22 in generally desired orientation for operations, generally upright position for vertical panel saw or a prone position for a horizontal panel saw.)

The sliding means 36 could be located proximate along the length of the bottom edge 48 on the front side 42. The sliding means or fence 36 could be movably connected to the front side 24 by a balancing fastener 44 located at a center of the sliding means or fence 36 allowing the fence 36 to rotate or pivot about the balancing fastener 44 to align the fence 36 to the railings 52 of linear guide 50 so as to achieve a substantially perpendicular relationship between the linear guide 50 and the fence 36. A knob fastener 46 could be located proximate to each end of the fence 36 generally passing through an oversized hole in the fence 36 (also allowing the fence allowing some travel about the knob fastener 46.) The respective knob fastener 46 could be further attached to the front side 24 of framework 22. Tightening the fastener knobs 46 secures the fence 36 in the desired orientation to framework 22 and the linear guide 50.

In one embodiment, the sliding means or fence 36 could be a horizontal flange running lengthwise along the bottom edge 30. The flange, in one version, could provide a lower friction surface by having a smooth or polished flange top edge to accommodate the material movement (e.g., for rip cut.) In another version not shown, the flange could have a low friction material such as polyethylene applied to it. In yet another version, the flange may present a plurality of rollers along the flange top edge upon which the material bottom edge may ride.

In some embodiments (e.g., a vertical panel saw 20), the framework 22 may further comprise counter-balance device (not shown). In one embodiment, the counter-balance device could be spring-tensioned pulley mounted proximate to the top edge 28 and connected by cable/wire to the carriage. In other embodiments, a counterweight could also be used rather than a spring. In this manner, the counter-balance device could sufficiently offset the weight of the assembly of the carriage and cutting tool during vertical panel saw operations to make it easier to move the assembly of the carriage and cutting tool along the length of the linear guide 50.

The base means 38 could be attached to or otherwise incorporated into the framework 22. For a horizontal panel saw (not shown) the base means 38 could be a table-like structure that could attach to the back side 26 and hold the framework 22 in a prone or laid flat position. For a vertical panel saw 20, the base means 38 could be one or more of a wide variety of devices that holds the vertical panel saw 20 in a generally upright, but leaned-back, fashion. One version of the base means 38 could be a series of feet 42 generally attached to the bottom edge 30 of the framework 22, the feet 42 generally being oriented to be perpendicular to the framework 22. The base means 38 could also have additional feet 42 (not shown) attached to the back side 26 proximate to top edge 28 to support the top edge 28 of the framework 22 as the panel saw 20 is leaned back against a supporting wall (of a room—not shown).

As substantially shown in FIGS. 2, 3, 4, 4A and 4 B, the linear guide 50 could be a set of railings 52 attach to the framework's front side 24 in spaced apart and parallel fashion. The top of the railings 52 (generally shown in FIGS. 1 and 4) could be attached proximate to the framework's top edge 28 while the bottom of the railings 52 could be attached framework's bottom edge 30 in a manner that substantially bisects the framework 22 into left and right sides. The railings 52 could be so attached to the framework 22 so that they are generally lifted up and away from the front side 24 (yet parallel to the front side 24), substantially creating a gap or space between them and the front side 24 through which the material to be cut (not shown) could be passed through the panel saw 20.

Each railing 52 could be comprised of a linear body of a definite length having an inner side 54 that faces the respective inner side 54 of the other railing 52 when assembled into a linear guide 50. The railing 52 could present lengthwise along the railing's inner side 54 an open-sided groove or channel 56 (e.g., with the open-sided channel 56 of one railing 52 generally facing inwards towards the open-sided channel 56 of the other railing 52.) The cross-sectional dimensions of the open-sided channel 56 could be constructed to generally match the cross-section of the carriage side edges 88 being sufficient to allow each of the open-sided channels 56 to respectively engage and retain a carriage side edge 88 to allow the carriage 80 to substantially have a controllable, precise, sliding relationship with the linear guide 50. The open-sided channel 56 could be placed proximate to a lower edge of inner side 54 (e.g., the inner side 54 that is located close to the front side 24 of the framework 22) so as to generally present the handheld cutting tool 110 closer to surface of the material to be cut (not shown) inserted in the panel saw 20.

The open-sided channel 56 could further have an enclosed channel end 58 (substantially shown in FIG. 4) proximate to a bottom of the railing 52 and an open channel end 60 (e.g., end aperture) proximate to the top of the railing 52. The location of open channel ends 58 could allow respective pair of carriage side edges 88 of the carriage 80 to generally align up in the linear guide 50 removably engaging the channels 56. The ability to have the carriage 80 to removably engage the open-sided channels 56 through the open channel ends 58 could allow the removal of the assembly of the carriage 80 and cutting tool 110 for the rotation relative to the linear guide 50 to change orientation of the handheld cutting tool 110 or for the substitution of another assembly of the carriage and cutting having a different type of handheld cutting tool 110. The enclosed channel ends 58 could prevent the carriage 80 from leaving the open-sided channels 56 when the carriage 80 bottoms out on the railings 52.

In one configuration for the linear guide 50 (as substantially shown in FIGS. 2 and 4), each of the railings 52 could be composed of a pair of off-set, nested railing brackets 62. Each railing bracket 62 could comprise a set of flanges, a side flange 64 and lower flange 66 connected together along a common edge. In at least one embodiment, common angle irons, in meeting such a rail bracket construction criteria could be used as railing brackets 62 in that angle irons, being readily and inexpensively available at most hardware stores, could not only simplify construction of the linear guide 50 but could possibly reduce the linear guide 50 construction costs as well.

Of the two railing brackets 62, one railing bracket 62 could be shorter in length than the other railing bracket 62, the shorter railing bracket 62 could be designated as the inner railing bracket 70 while the longer railing bracket 62 could be designated as the outer railing bracket 72. The inner railing bracket 70 could be constructed of flanges 64, 66 having narrower widths than those of the outer railing bracket 72. The inner railing bracket 70 could be nested within a longer, outer railing bracket 72 in an off-set manner so that the combination of the lower flanges 66 (along with a portion of the outer railing bracket's side flange 64) could form an open-sided channel 56 generally having a U-shaped cross section. As noted above, this nested configuration could locate the open-sided channel 56 on the lower edge of railing's inner side 54 (as noted above.)

Figure 4:
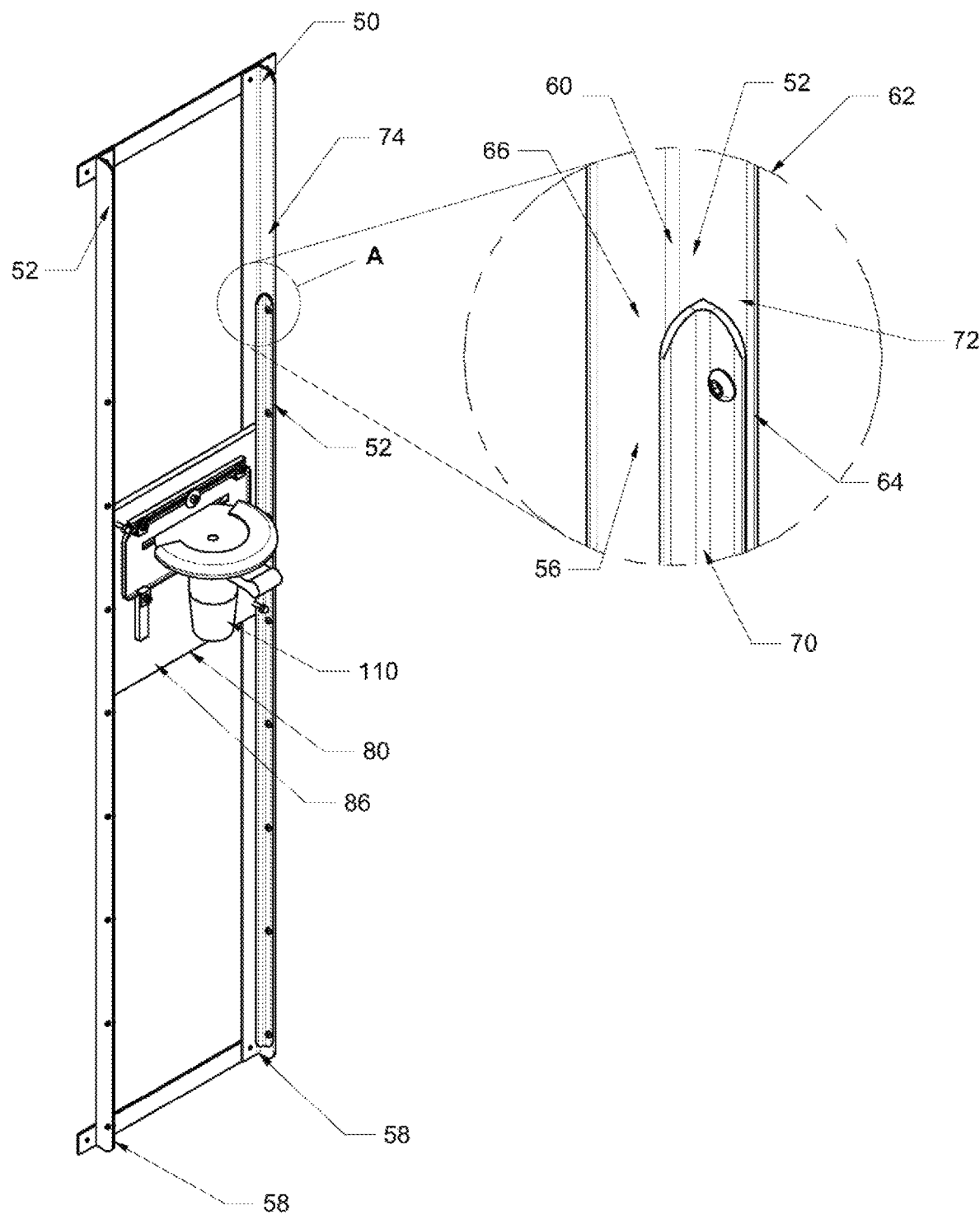
FIG. 4 is substantially a perspective view of one embodiment of the carriage engaged with the linear guide showing a close up where the carriage engages the railing.
Figure 4A:
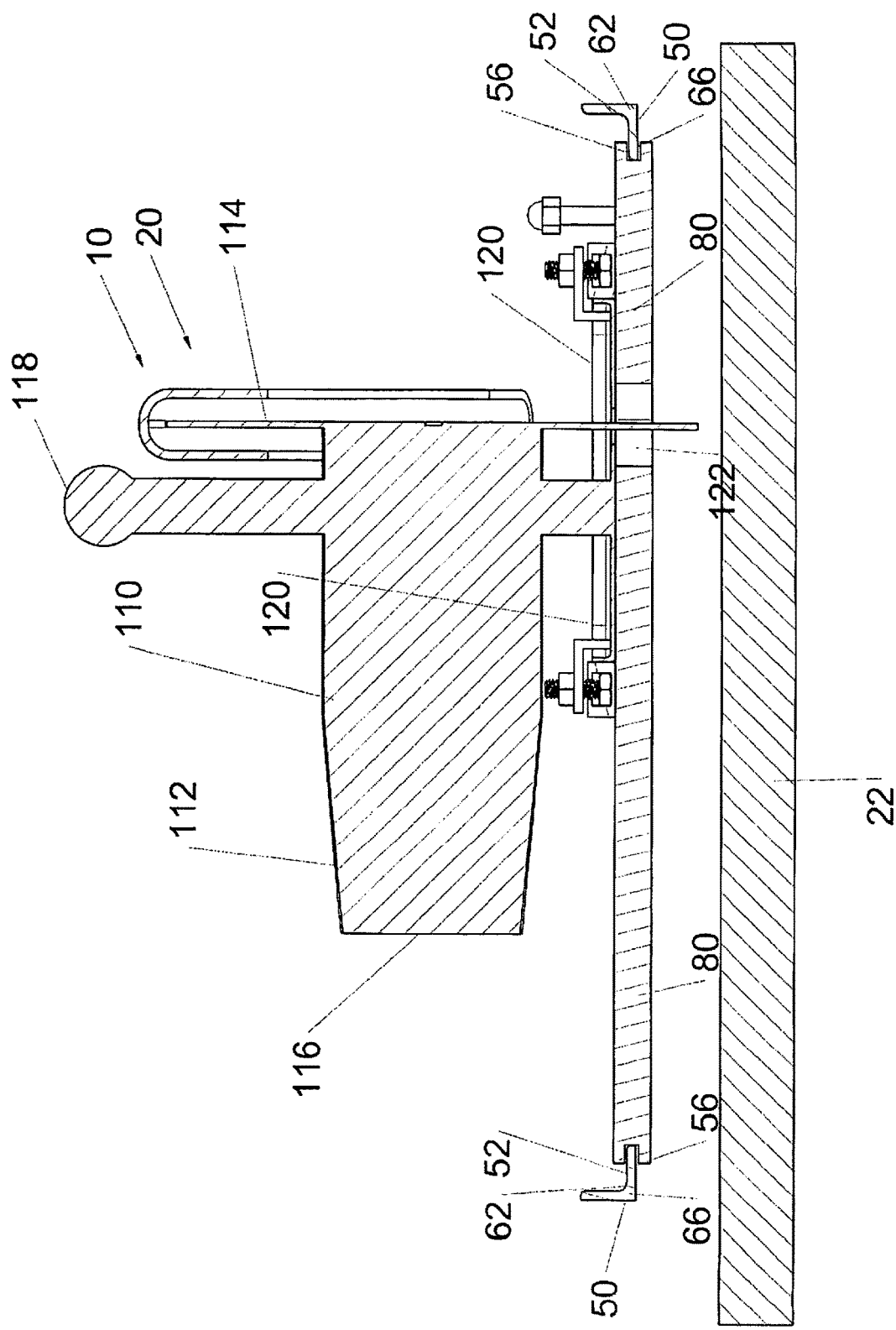
FIG. 4A is substantially a cross section view of yet another embodiment of present invention.

As the railing brackets 62 aligned up to form a railing 52, a portion of the outer railing bracket 72 could extend past a top of the inner railing bracket 70 to reach the top of the linear guide 50 (as substantially shown in FIG. 4). This portion of the linear guide 50 so formed could be the aligning means 74 by which the carriage 80 is taken in and out (e.g., removably engages) of the linear guide 50. The distance from this top end of the inner railing bracket 70 to the top of the linear guide 50 and top edge 28 of the framework 22 could be equal to or greater thanes the length of the carriage side edge 88. When the engaged carriage 80 is moved into the linear guide 50 into this alignment means 74, the carriage 80 could still be contact with the outer railing bracket 72 but not the inner railing bracket 70. The carriage 80 at that point may no longer be considered captive within the linear guide 50. This carriage 80 placement upon the linear guide 50 could allow the operator (not shown) to grasp the assembly of the carriage and the cutting tool- and pull the assembly of the carriage and the cutting tool straight up and away the linear guide 50/front side 24. The carriage 80 could then be exchanged with another carriage 80 bearing a different handheld cutting tool 110 or the carriage 80 could be rotated (in orientation to the linear guide 50) by ninety (90°) degrees (or both) before being placed within alignment means 74 for reinsertion into (e.g., becoming captive within) the linear guide 50. Generally, the movement of the carriage assembly 80 in the linear guide 50 during panel saw operations would not place the carriage 80 within the alignment means 74.

Another possible configuration for the railings 52 (as substantially shown in FIG. 3) could be a definite length of extruded material having a lengthwise open-sided channel 56, the positioning, cross-section, and other dimensions for the open-sided channel 56 could match those of the open-sided channel 56 of multiple railing brackets 62 as set forth above. It is thought that an extruded railing could be best suited for commercial version of the invention 10. This extruded railing could also feature a cut away portion of its upper flange near the top of the linear guide 50 to form an alignment means 74.

Figure 3:
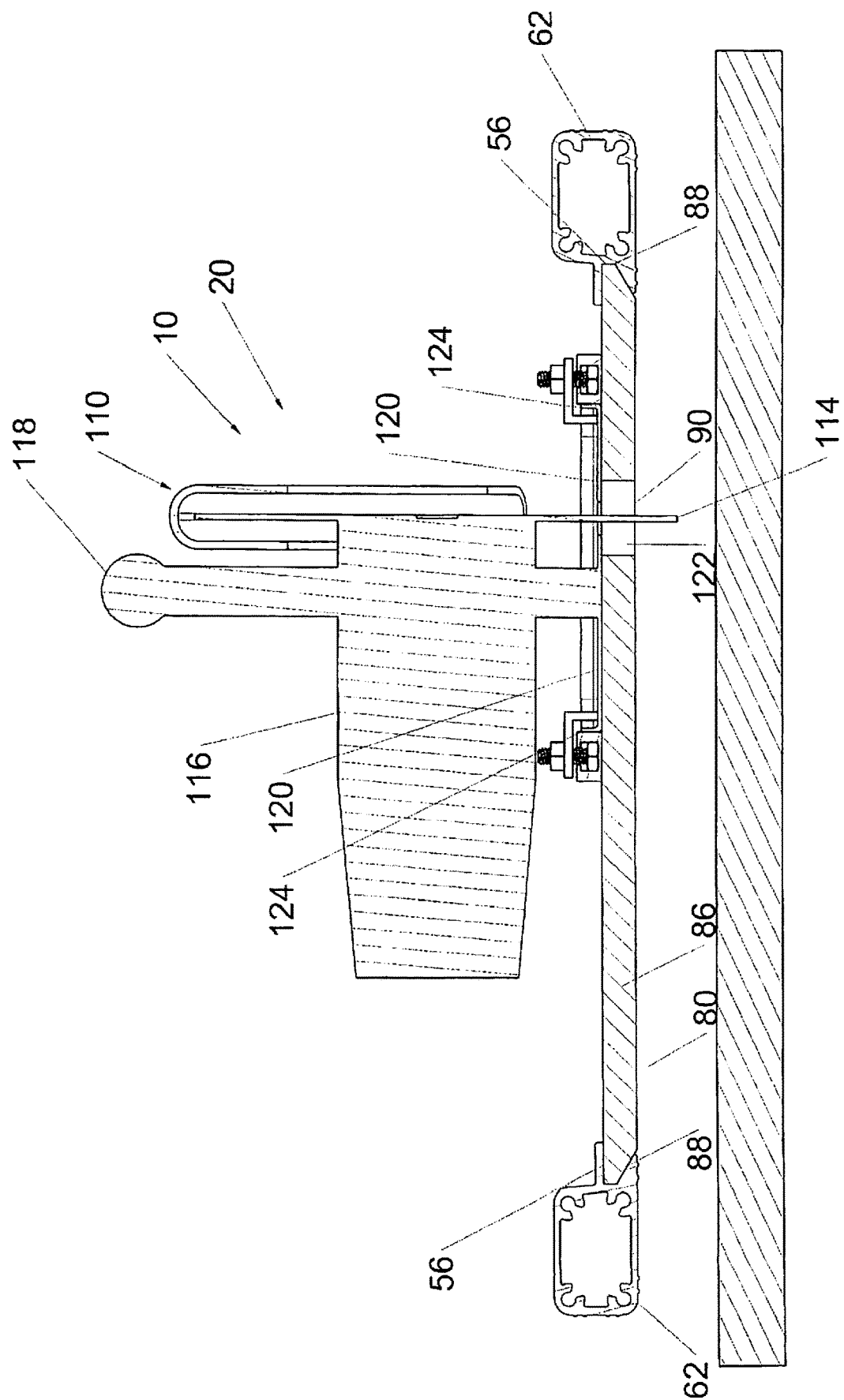
FIG. 3 is substantially a cross section view of another embodiment of present invention.
Figure 5:
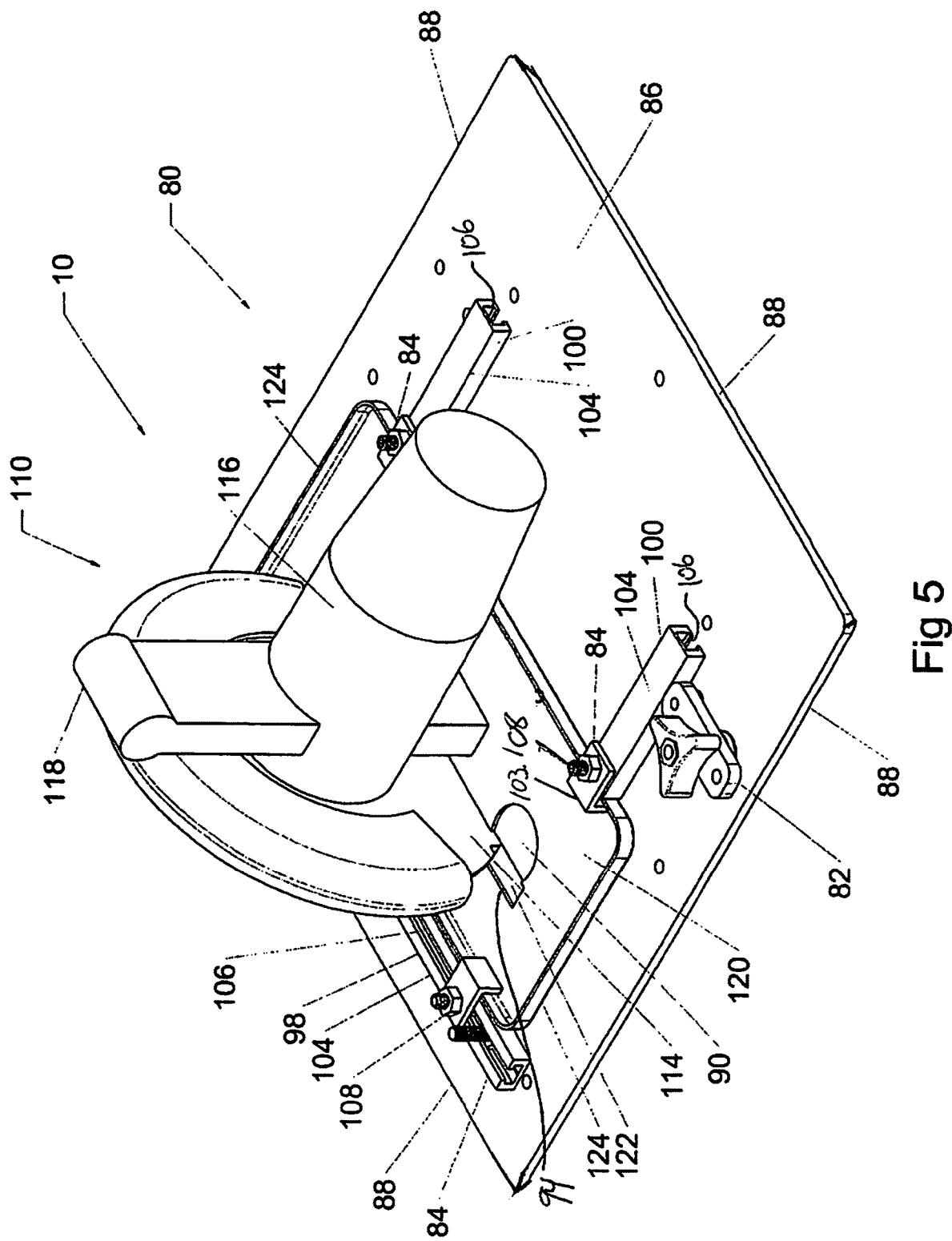
FIG. 5 is substantially a perspective view of one embodiment of the invention of the carriage with a removably mounted cutting tool.

In one version of this embodiment as substantially shown in FIGS. 3 and 5, the carriage side edges 88 could be beveled and an edge of the channel 56 could be beveled as well. The beveled carriage side edge 88 could movable rest atop of the beveled edge of the open-sided channel 56 in a manner that allows the operation of the cutting tool 110 upon material (not shown) placed in the panel saw 20 to cause the carriage 80 to self-center within the linear guide 50.

Yet another embodiment of the invention 10 (as substantially shown in FIG. 4A) could have the carriage side edges 88, not the railings 52, present an open-sided channel 56. This embodiment could have just the lower flange 66 (generally parallel to the front side 24 of the panel saw 20) of the outer railing bracket 72 that forms the railing 52 for the linear guide 50. Each carriage side edge 88 of a pair of carriage side edges 86 could then respectively form an open-sided channel 56 to reversibly and movably receive a respective lower flange 66. In this manner, for each pair of carriage side edges 88 there could be a pair of open-sided channels 56 could allow the carriage 80 to glide along the set of lower flanges 66 of the railing pair 52 generally constituting the linear guide 50. Part of lower flange 66 could be machined away in one region (e.g., up towards the top of the linear guide 50) allowing the carriage 80 to be removed from or inserted into the linear guide 50.

Figure 4B:
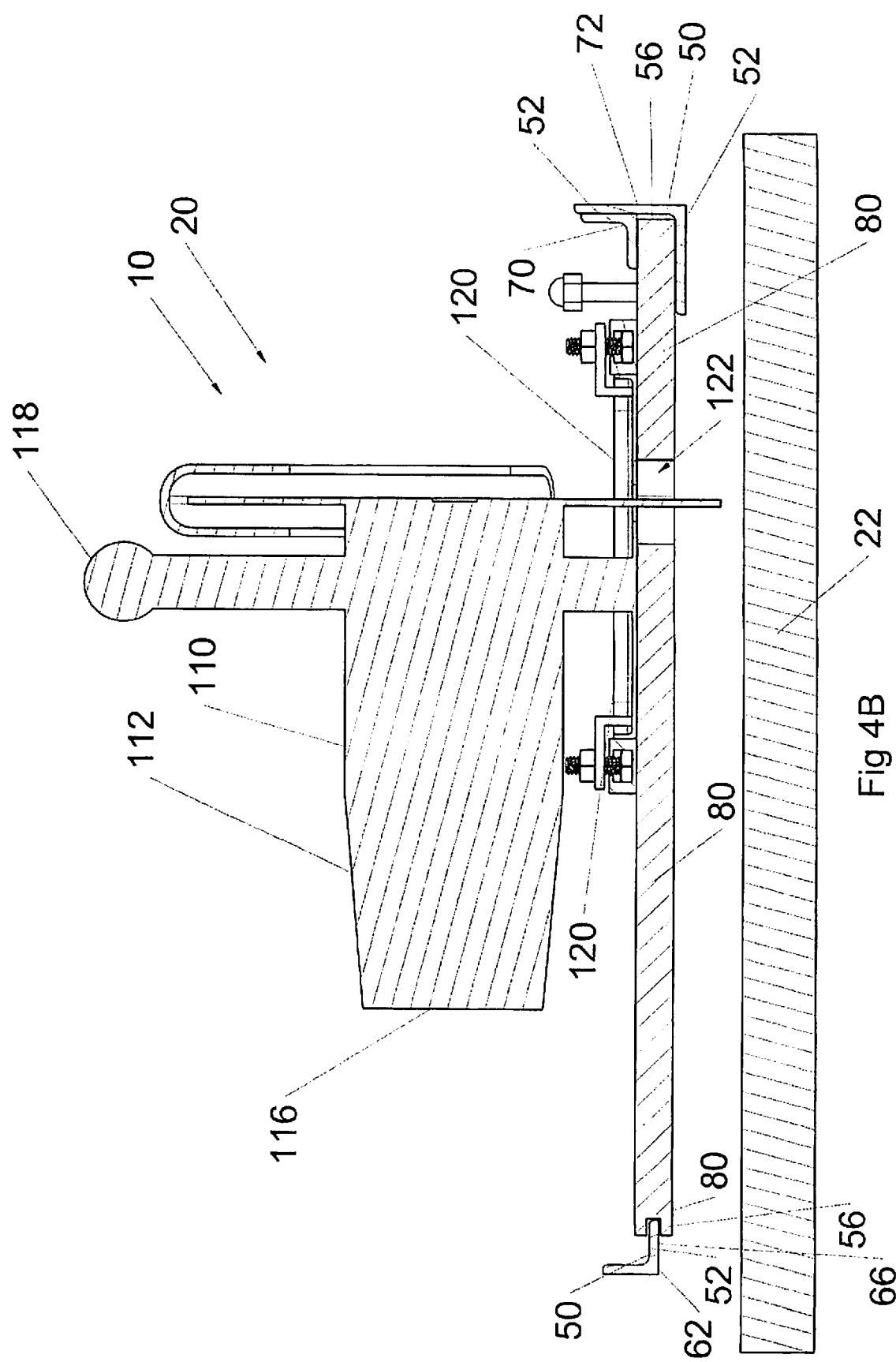
FIG. 4B is substantially a cross section view of still yet another embodiment of present invention wherein the linear guide is made from a combination of different types of railings.

As substantially shown in FIG. 4B, it should be noted that in still yet another possible embodiment, the linear guide 50 could be constructed from a combination of different type of railings 52. One railing 52 (e.g., formed only be the one outer railing bracket 72) could present only the lower flange 66 that is reversibly and movably received within the open-sided channel 56 as formed by one carriage side edge 88 of a carriage side edge pair. The other remaining railing 52 (e.g., formed by outer railing bracket 72 and the inner railing bracket 70) could conversely form an open-sided channel 56 that reversibly receives the remaining carriage side edge 88 of the carriage side edge pair. It is noted that the other pair of carriage side edges 88 could be similarly constructed as the first pair of carriage side edges 88 thus allowing the carriage 80 to be removed from the linear guide 50; rotated 90 degrees; reinserted into the linear guide 50 to change the orientation of the handheld cutting tool 110 (as mounted to the carriage 80) relative to the linear guide 50.

Figure 6:
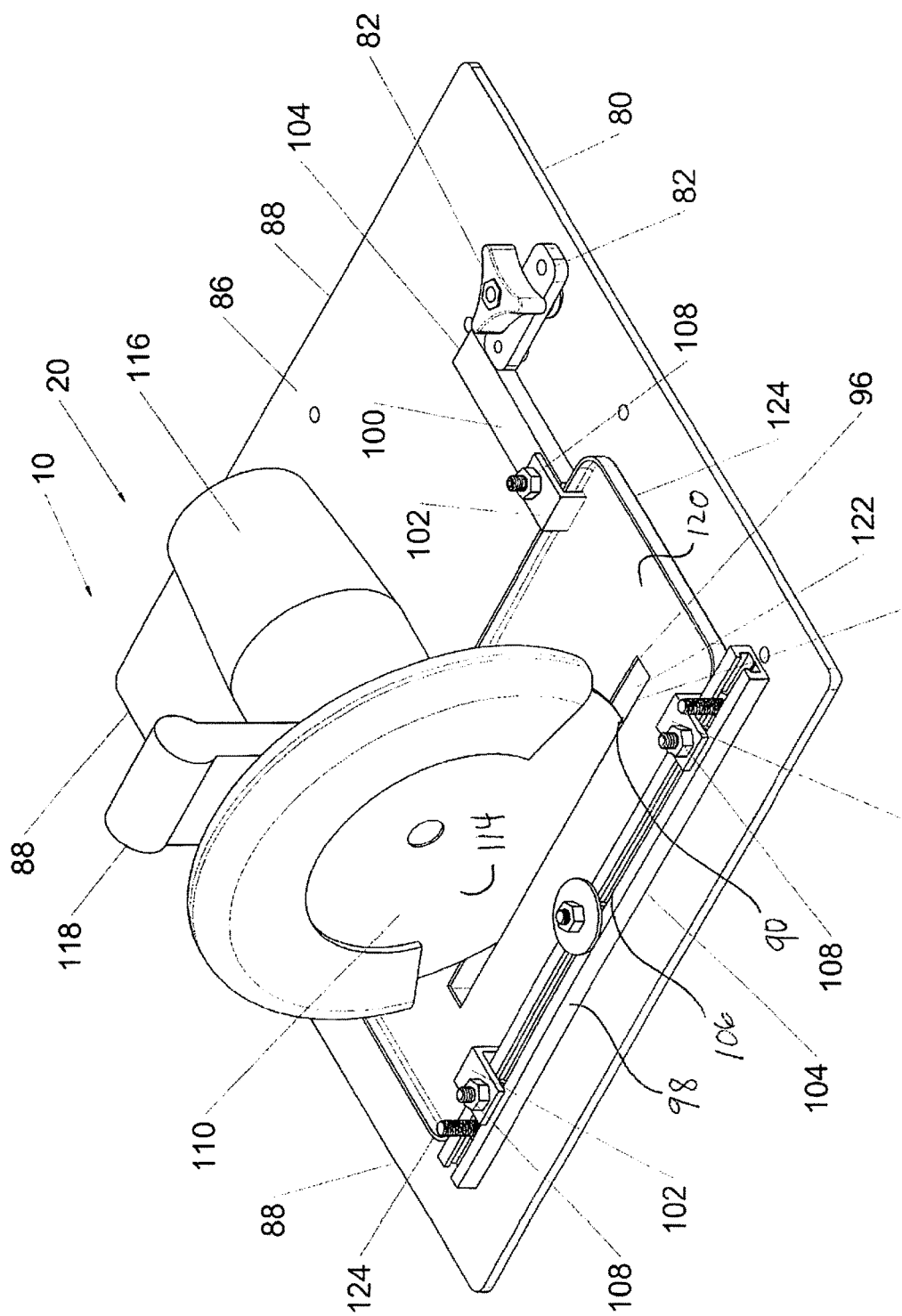
FIG. 6 is substantially another perspective view of one embodiment of the carriage with a removably mounted cutting tool.

As substantially shown in FIGS. 5 and 6, the carriage 80 could be constructed to universally hold different makes of a one specific type of hand-held, cutting tool 110 (powered or manually operated.) For, example, one carriage 80 could be constructed to removably mount powered routers (not shown), while another carriage 80 is constructed to removably mount circular saws. Although the following description teaches one embodiment of the carriage removably mounting a powered circular saw, other carriage embodiments not shown, could be employed to removably mount other types of hand-held cutting tools 110 and considered to be well within the purview of the present invention 10.

For instance, one version of the carriage 80 could be made to be adjustable to removably mount various makes and manufactures of one type of tool, e.g., a non-panel saw dedicated, hand-held, powered circular saw 112. The carriage 80 in such an embodiment could comprise a tool plate 86, carriage securing means 82 for reversibly locking the carriage 80 relative to the carriage's position on the linear guide 50, one or more types of tool securing means 84 for reversibly mounting the handheld cutting tool 110 to the tool plate 86. The tool plate 86 could be a sheet (of suitable metal or other material) defined by at least two pairs of opposing carriage side edges 88 (e.g., generally of equal length. Each pair of opposing carriage side edges 88 could be capable of simultaneously engaging the linear guide's open-ended channel pair 56 in such a manner that the movement of the tool plate 86 within the linear guide will not allow the tool plate 86 to change its orientation with respect to the linear guide 50 (e.g., the tool plate 86 needs to be removed from the linear guide 50 to change the orientation of the tool plate 86 [and hence the carriage 80] relative to the linear guide 50.) The tool plate 86 could form a rectangular cutting aperture 90 with a first long side 94 of the aperture 90 being parallel and proximate to one of the carriage side edges 88. The short sides of the aperture 90 could be parallel and proximate to their respective carriage side edges 88 as well. The remaining second long side 96 could be parallel, yet distal from its respective carriage side edge 88.

Proximate to each of carriage side edges 88 of the pair of carriage side edges 88 that could engage the linear guide 50 to orient the handheld cutting tool 110 for a ripping cut- could be located the carriage securing means 82. More specifically, the carriage securing means 82 could be located proximate to the middle of each those carriage side edges 88. The carriage securing means 82 could be a reversible attached fastener, lock, or clamp (e.g., horizontal handle toggle clamp such as CL-150-HTC model made by Carr Lane Manufacturing Co, 4200 Carr lane Ct, P.O. Box 191970, St. Louis, Mo.) 92, or the like. Each carriage securing means 82 could exert force (e.g., press down) onto the top edge of a railing 52 (not shown) to respectively lift up the respective carriage side edge 88 up against a top portion (not shown) of a respective open-sided channel 56 containing that carriage side edge 88. Utilizing opposing pairs of carriage securing means 82 to engage the respective railings 52, a carriage 80 could be moved along the length of the linear guide 50 and then be secured in a desired position upon the linear guide 50 (e.g., securely placed for a particular rip cut.)

Various types of tool securing means 84 could be employed on the tool plate 86 for removably securing or mounting the handheld cutting tool 110 to the tool plate 86. The cutting edge or portion 114 of the handheld cutting tool 110 could be removably secured to the tool plate 86 so as to protrude through the cutting aperture 90 of the tool plate 86. For attachment of a power circular saw to the plate 86, there can be respectively first and second tool securing means 98, 100. The first tool securing means 98 for aligning the handheld cutting tool 110 could comprise a securing track 104 to which two or more L-clamps 102 (the clamp having an L-shape) are fastened. The securing track 98 could have a body of definite length with a lateral C-shaped cross-section forming an open-sided groove 106 sandwiched between two open ends) is fastened to the plate 86 proximate to the first long edge 94 of the cutting aperture 90 with the open groove located at the top of the securing track. The L clamps 102 are reversibly attached to the track 104 through L-clamp's groove 106 by fastener combination 108 (e.g., bolt-nut) as to present the arms of the L clamp 102 along the side of the track 104 proximate to the first long side 94 of the cutting aperture 90. In this manner, the arm of L-clamp 102 can grasp a portion of a raised flange 124 of guide plate 120 to secure that portion between the arm and a side of the securing track 98 holding a portion of the guide plate 120 against the tool plate 86. The securing track 98 further acts as an abutment against which the flange 124 of guide plate 120 can be secured and be aligned to properly orient the handheld cutting tool 110 upon the tool plate 86.

Multiple second tool securing means 100 can be located on tool plate 86 proximate to second long side 96 of the cutting aperture 90. The second tool securing means 100 could also be comprise a set of securing track 104 and L clamp 102 combinations. The track 104 can be mounted on the tool plate 86 so that track's open groove 106 is against the tool plate 86. The track 104 could be mounted substantially perpendicular to the second long side 96 with one of track's open ends being proximate to the second long side 96. The various second tool securing means 100 so employed could have a parallel spaced-apart relationship to one another as second tool securing means 100 are perpendicularly parked against the second long side 96.

To secure the second tool securing means 100 to the tool plate 86, the fastener combinations 108 could be flush face machine screws (not shown) penetrating the tool plate 86 to pass into the open side of the groove 106 to substantially connect to nuts generally held captive within the groove. By adjusting the tension via the fastener combinations 108, the track 104 and the track's respective L-clamp 102 can move linearly along the fastener combinations 108 in a perpendicular fashion relative to the plate (e.g., the one open end of the track 104 being moved closer or further away from the second long edge 96.) Once the track 104 is in the desired position, the fastener combinations 108 holding the track 104 can be tightened to secure the track 104 in the desired disposition on the tool plate 86. In a similar manner, a L-clamp 102 may be attached to top of the securing track 104 near a track end so that the space between the arm of the L-clamp 102 and the end can reversibly engage another a portion of the tool flange 124. The adjustability of the second securing means 100 allows the carriage 80 to adjust for handheld cutting tools 110 having guide plates 120 of different widths.

The handheld cutting tool 110 in one embodiment could be a standard, hand-held, power circular saw 112, which can be available for other cutting uses by itself outside of it employment with the panel saw 20. The saw 112 could comprise cutting portion 114 (e.g., saw blade) that is rotatably attached to a motor (not shown) held in a body 116, the body 116 having attached to its top a handle 118 and to its bottom a guide plate 120 having a slot-like tool aperture 122 through which the cutting portion 114 (e.g., saw blade 112) could rotate. Many of these guide plates 120 could be rectangularly-shaped, with the long sides of the guide plate 120 being parallel to the tool aperture 122 while the short sides are respectively perpendicular to the cutting aperture 90. The guide plate 120 could have a tool flange 124 rising up and continuously running along the tool plate's sides. The tool flange 124 in its ordinary use could be placed against a straight edge, ruler or other similar saw guide (not shown) to help move the handheld cutting tool 110 to provide desired cut.

When the circular saw 112 is being attached to the carriage 80 (e.g., tool securing plate) the circular saw 112 could be placed on the tool plate 86 so that the bottom of the guide plate 120 lies flat upon the top of the tool plate 86 in a manner that the cutting portion 114 (e.g., saw blade) protrudes through the tool aperture 122. At the same time, a portion of the flange 124 (e.g., running along side of the guide plate 120) can be abutted against the first tool securing means 98 to properly align the handheld cutting tool 110 with respect to the carriage 80. The L clamps 102 of first tool securing means 98 could engage and retain a portion of the flange 124 while two or more second tool securing means 100 could be moved relative to the guide plate 120 so that the respective L clamps 102 could removably engage portions of the flange 124 found on the other opposing long side of the guide plate 120. As the L-clamps 102 attach to the guide plate 120, the L-clamps 103 could further press the guide plate 120 upon the tool plate 86. To release the handheld cutting tool 110 from the tool plate 86, the fastener assembly 108 could be loosened to release the L Clamps 102 thus releasing the flange 124 and allow for the cutting tool's removal from the carriage 80.

Another advantageous embodiment (not shown) could beneficial if the exact cutting tool 110 that will be used in the carriage assembly is known prior to manufacture of the tool plate assembly. In this embodiment, a second securing track 104 (in addition to the first securing track 104 and instead of the $2^{nd}$ tool plate securing means as denoted above) could be installed (in parallel to the first securing track 104) on the tool plate 86 so that it would be proximate to the opposite edge of guide plate 120 when the handheld cutting tool 110 is loaded upon the tool plate 86. L clamps 102 could also then be used to secure that opposing edge of the guide plate 120 to the second track 104.

In another advantageous embodiment (not shown), the features of the securing track 104 could be machined directly into the tool plate 86. These machined slots in tool plate 86 could eliminate the need to install separate securing tracks 104. For this embodiment, the tool plate 86 should be made of a material sufficiently strong and thick to make this embodiment strong enough to handle saw operations when compared to securing track 104 embodiment.

Figure 6A:
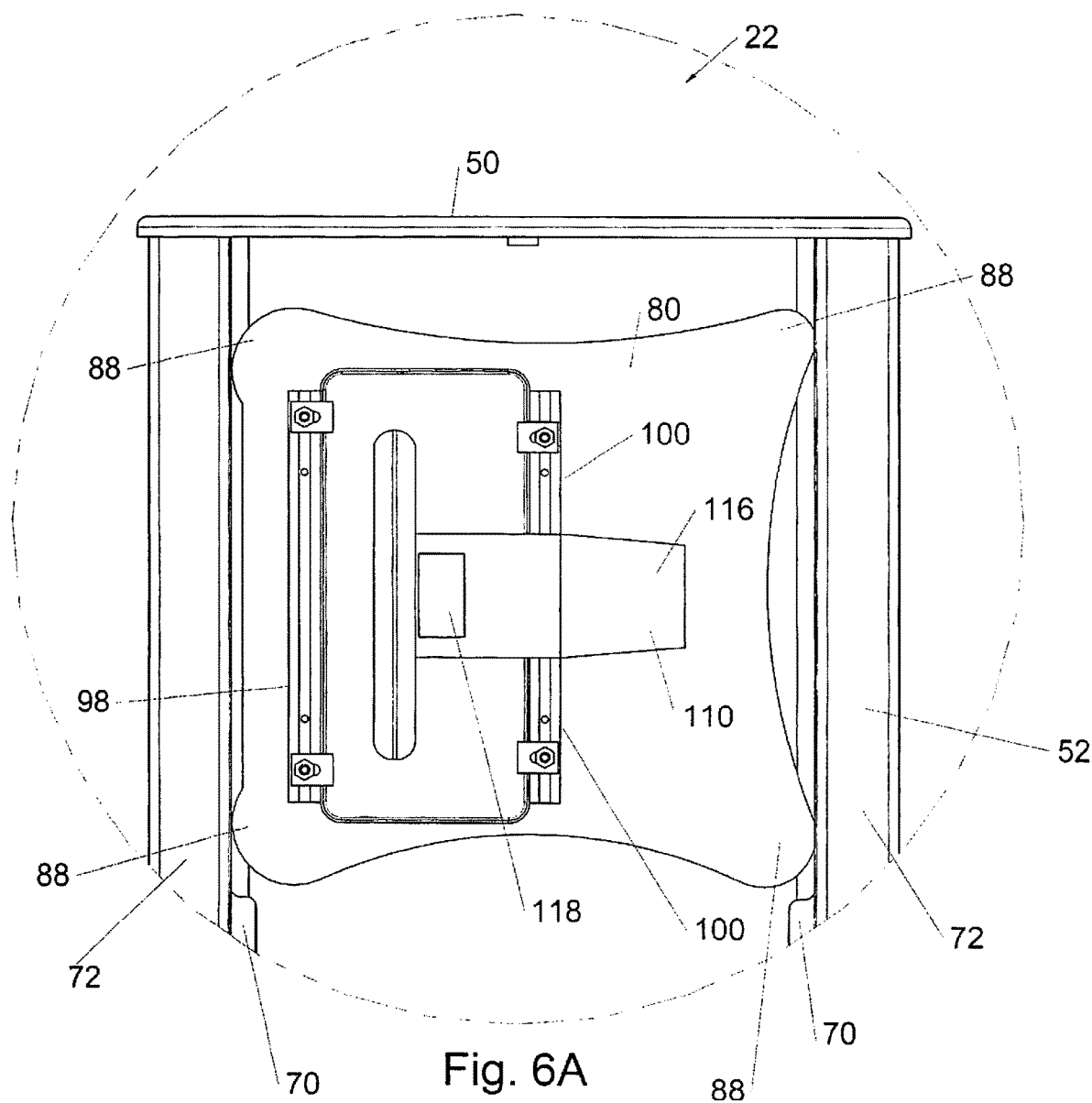
FIG. 6A is substantially an overhead view of another embodiment of the carriage about to be inserted into the linear guide.
Figure 7:
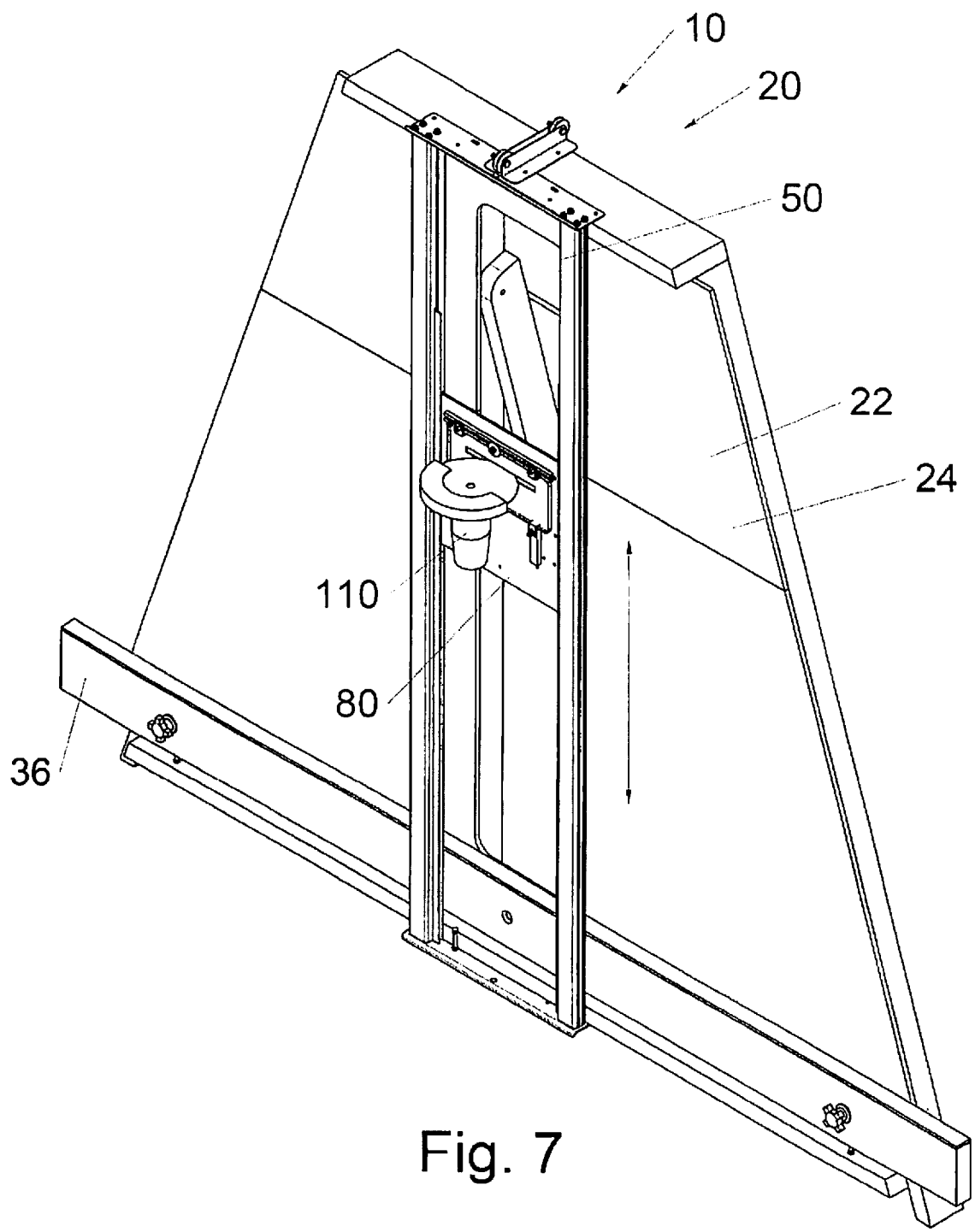
FIG. 7 is substantially a perspective view of one embodiment of the present invention with a carriage cutting tool combination oriented at a correct height upon the linear guide for a desired rip cut operation.
Figure 8:
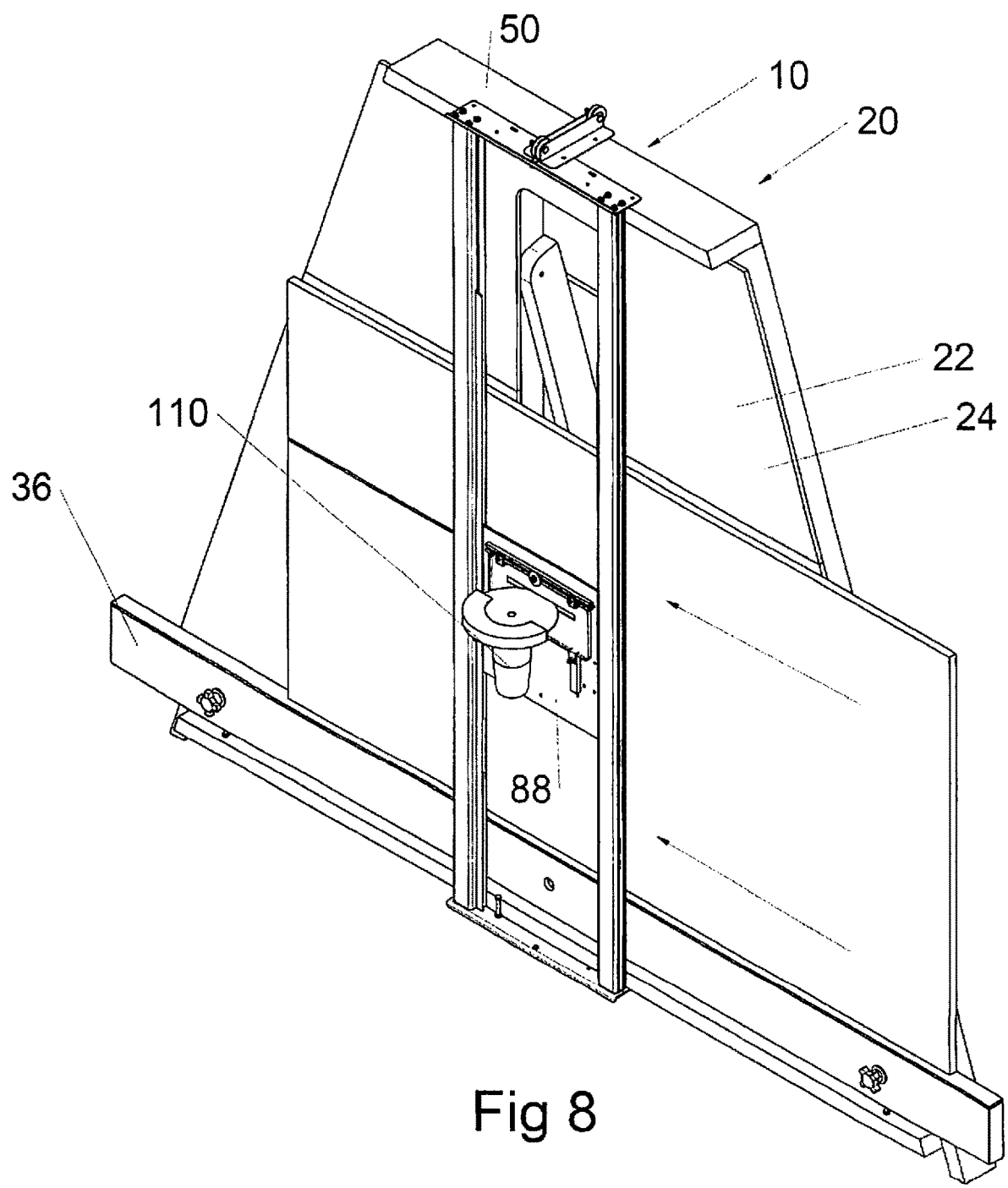
FIG. 8 is substantially a perspective view of one embodiment of the present invention with a carriage cutting tool combination locked in placed on the linear guide and the material to be cut being moved through the panel saw for a rip cut operation.
Figure 9:
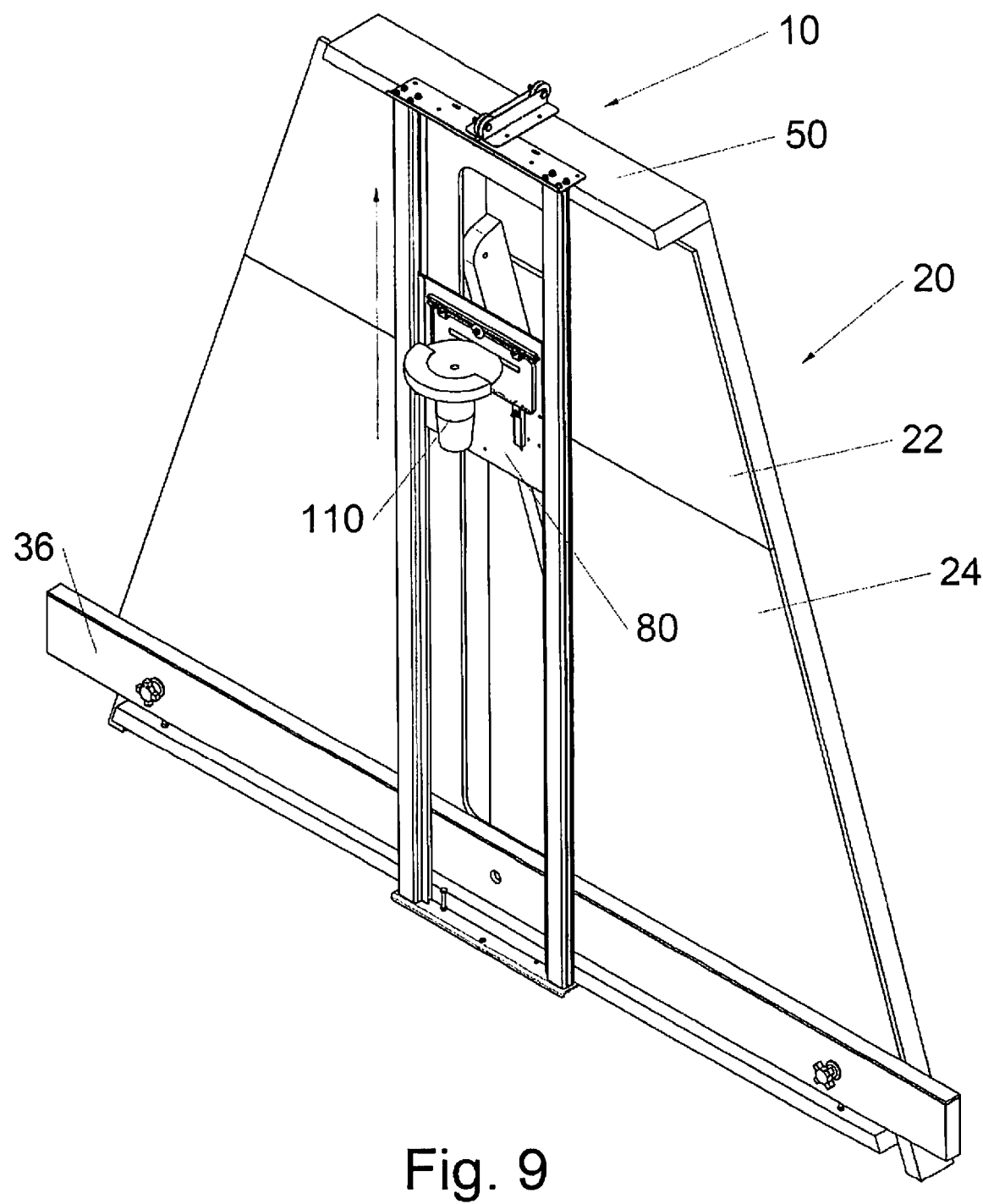
FIG. 9 is substantially a perspective view of one embodiment of the present invention with an assembly of the carriage and cutting tool oriented for a rip cut operation being moved up along the linear guide to a point on the set of railings were the carriage can be removed from the linear guide.
Figure 10:
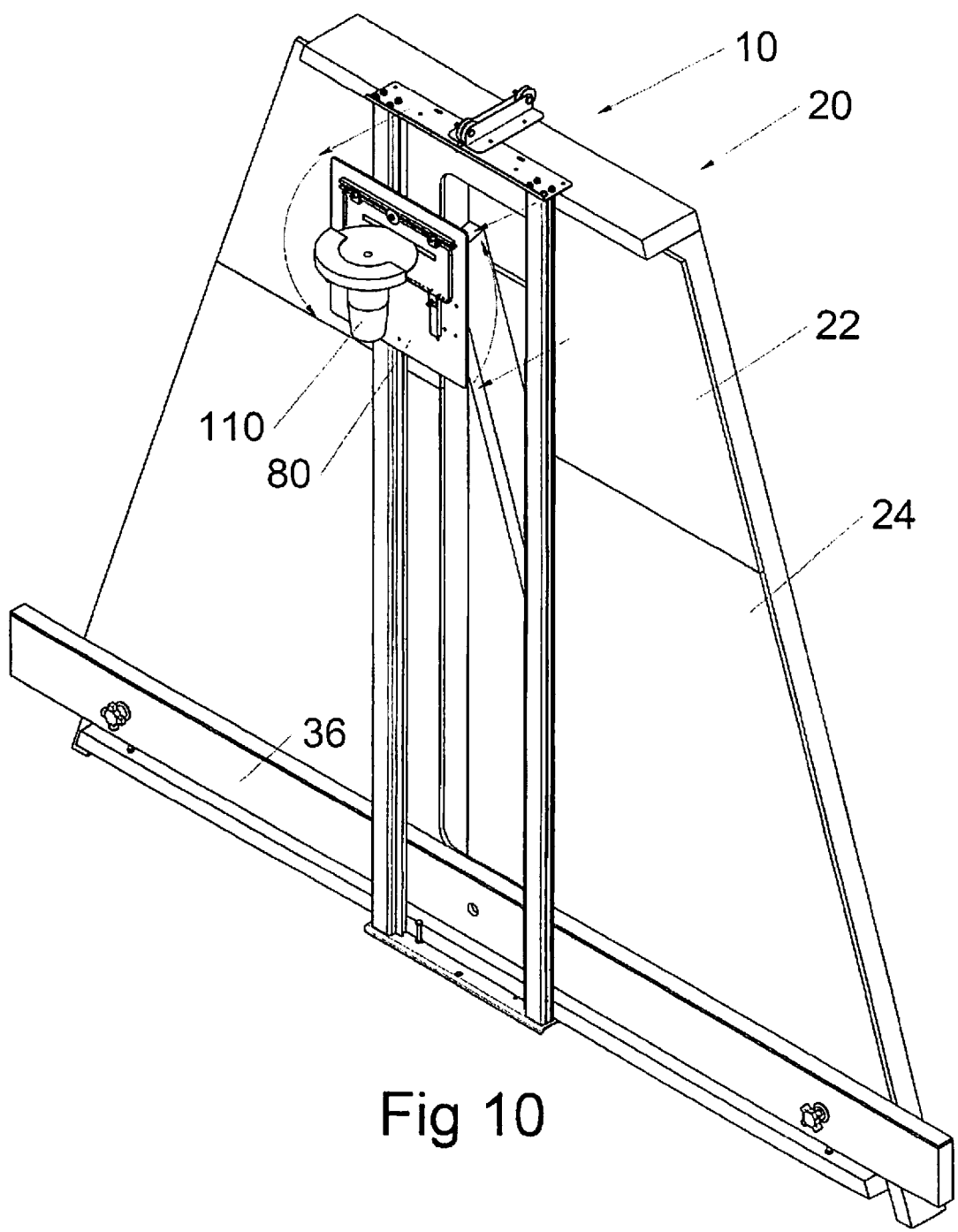
FIG. 10 is substantially a perspective view of one embodiment of the present invention with the assembly of the carriage and cutting tool being removed from the linear guide and rotated 90 degrees for reorientation for cross cut operations.
Figure 11:
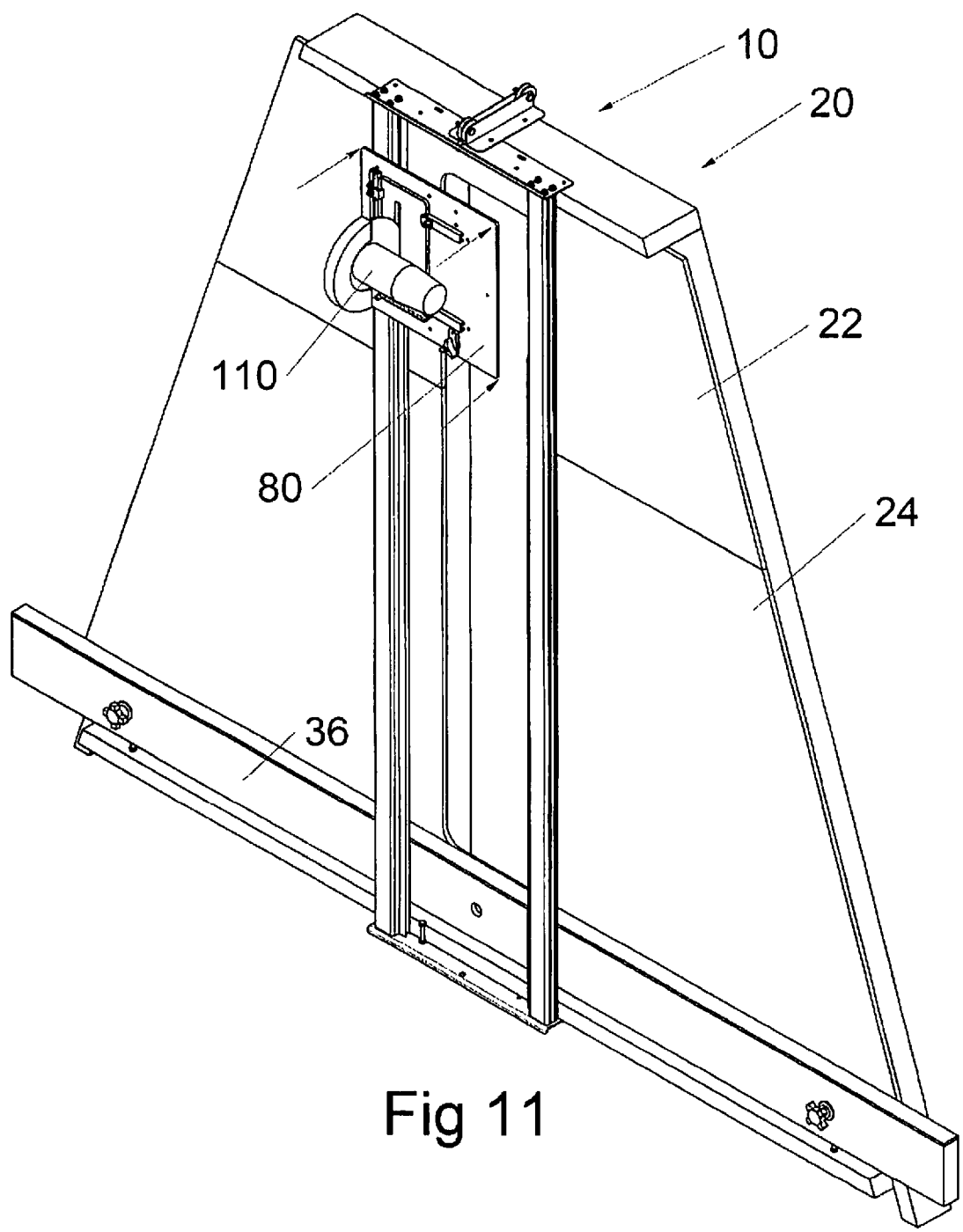
FIG. 11 is substantially a perspective view of one embodiment of the present invention with an assembly of the carriage and cutting tool being reinserted into the linear guide for cross-cut operations.
Figure 12:
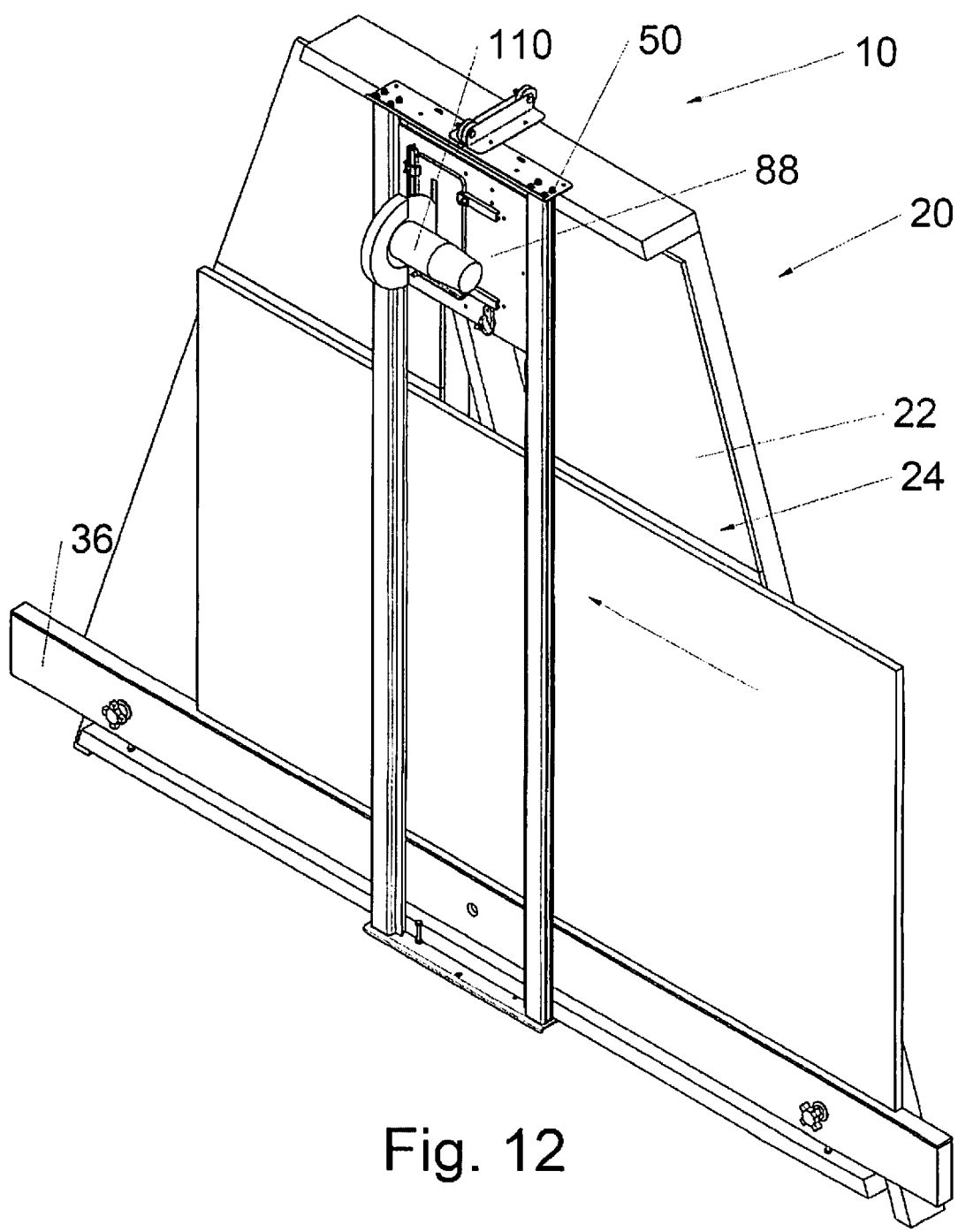
FIG. 12 is substantially a perspective view of one embodiment of the present invention with material moved into the panel saw for cross-cut operations.
Figure 13:
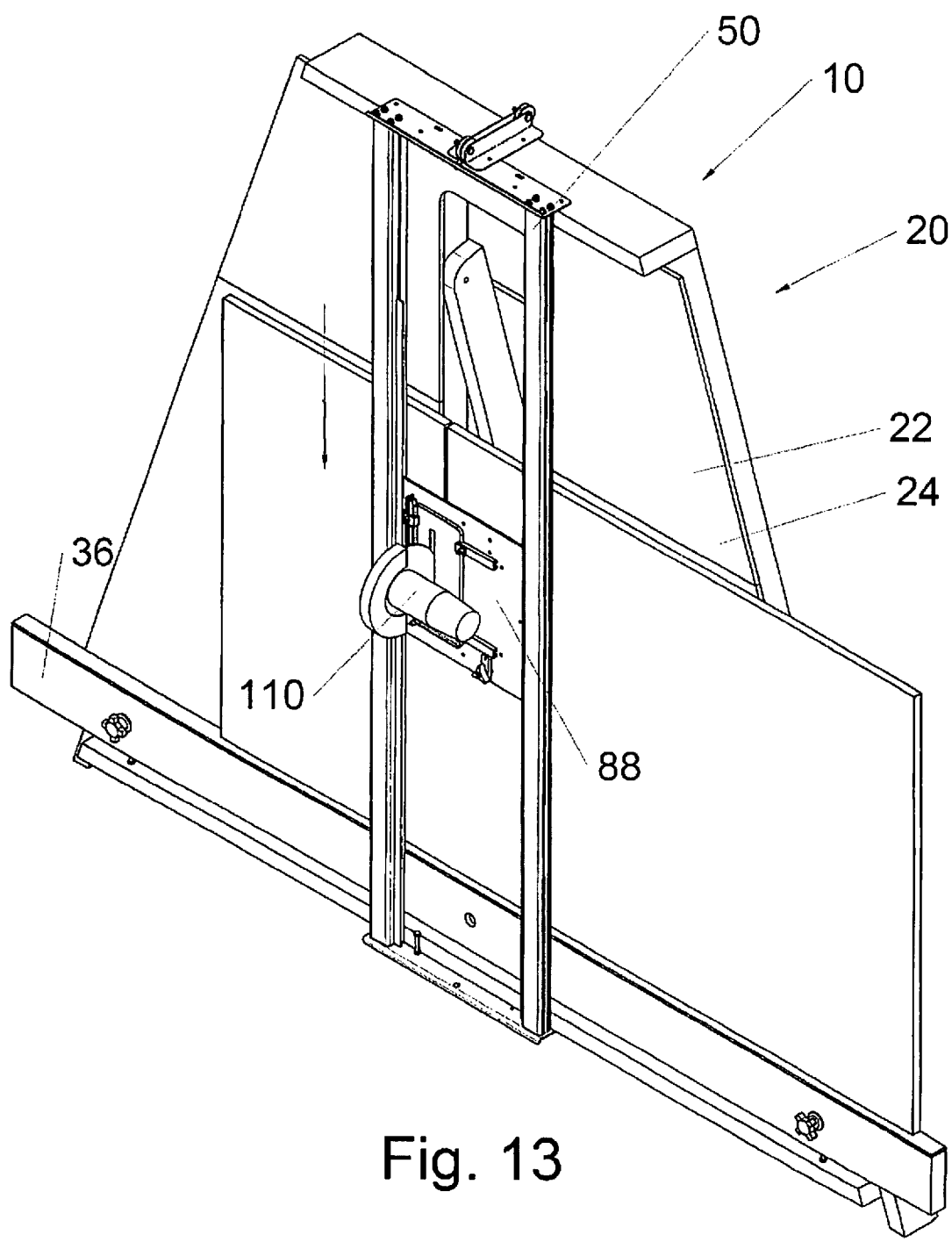
FIG. 13 is substantially a perspective view of one embodiment of the present invention with an assembly of the carriage and cutting tool being moved down the linear guide and engaging the inserted material to be cut to create a cross cut.
Figure 14:
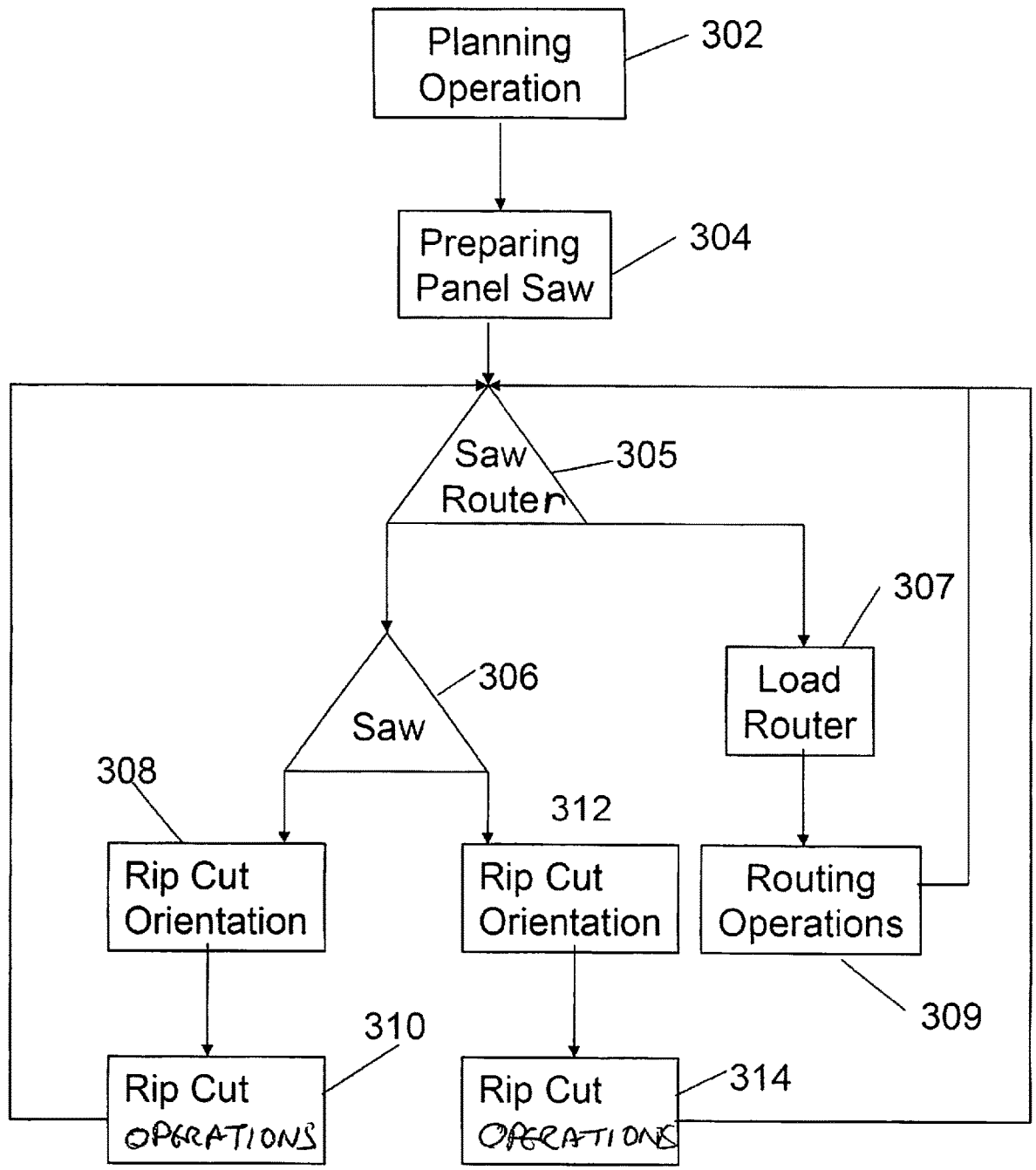
FIG. 14 is substantially a flow chart schematic showing one possible embodiment of process or method for operating the invention.

As substantially shown in FIG. 6A, the tool plate 86 could be any shape so long as the tool plate 86 fits within the linear guide railings 52 and has multiple contact points on each tool plate side is spaced far enough apart to generally ensure smooth longitudinal movement along the linear guide 50 and prevent undesired movement of the tool plate 86 (e.g., rotational or lateral movement within lateral guide 50.)

Method

As substantially shown in FIGS. 7-14, the process or method 300 of using the invention 10 could start with step 302, planning operations. In this step, the operator could make the initial decisions as what kind of material needed to be cut or otherwise be operated upon by the invention 10; the type of cutting or other operation to be performed by the invention (saw cuts, beveling, or other action); the type of cutting tool needed to accomplish the type of cutting or other operation, selection of carriage needed to mount the selected tool to the invention and the like. Once these decisions are substantially reached, then process 300 can proceed to decision step 304, preparing the saw.

In step 304, preparing the saw, the operator can obtain the appropriate carriage for securing the selected type of power tool. The operator then can attach the appropriate type of cutting tool to the carriage. As this step is substantially completed, the process 300 could proceed to decision 305 deciding type of operation.

In decision 305, deciding type of operation, the operator decides what the action should be used in operating the invention 10. If the operation uses a saw, then, the process 300 could proceed to decision 306 type of saw action. If the operation is for a router, the process 300 could proceed to step 307, load router.

In step 307, load router, the operator attaches the router/carriage combination to the linear guide. The router action does not require that a specific pair of opposing carriage edged be selected for a specific type of action (e.g., rip cut vs. cross cut) simplifying the engagement of the carriage to the linear guide (e.g., railings.) As this step is substantially completed, the process 300 could proceed to step 309, routing operations.

In step 309, the router operations, the assembly of the carriage and the route could be fixed at a certain height for horizontal edges to be routed, or be left movable for vertical edges to be routered down along the linear guide for a material fixed in place on the framework. The assembly of the carriage and the router for non-linear changing edge could also left movable upon the linear guide to move along the changing edge as the material to be cut is moved relative to the linear guide. Once the routering action for the material to be cut is accomplished, the router can be de-energized, the carriage can be moved and locked into a position at the top of the linear guide to clear the worked upon material to be cut. The material to be cut can be repositioned for another action; removed and replace with different material to be cut or the like. At the substantial completion of this step, the process 300 can return to step 305 if additional operations is required.

At decision 306, type of saw action, if the operator should decide that the action should be of a rip-cut type (e.g., horizontal movement of material into stationary cutting tool) then the process 300 could proceed to step 308, rip-type orientation. If the operator decides a cross cut-type action, then the process 300 could proceed to step 312, cross-cut orientation.

In step 308, rip-cut type orientation, the carriage can be introduced into or engaged by the linear guide to place the power tool in the proper vertical orientation for the operation. If the carriage has been previously loaded into the linear guide but the cutting tool is not in the proper orientation (e.g., the plane of the saw blade is in a horizontal orientation), the carriage can be removed (e.g., lifted up and out) from the linear guide assembly; partially rotated (e.g. ninety [90°] degrees) to place the plane of the saw into the vertical orientation and reinserted into the linear guide. As this step is substantially completed, the process 300 could proceed to step 310 rip-cut type operations.

In step 310 rip-cut type operations, with the assembly of the carriage and cutting tool in place within the linear guide, the assembly of the carriage and cutting tool can be locked in place at the top of the linear guide to provide clearance for material to be loaded into the panel saw. As the lower edge of material rides on sliding means, the portion of the material to be cut is introduced between the linear guide and the front side of the framework. Once the portion is located between the railings so that the cutting tool can make the appropriate cut upon the portion, the material to be cut is secured within the framework. At this time, the cutting tool can be energized and the carriage can be released from the carriage's locked position on the linear guide. The operator can move the carriage along the linear guide until the cutting portion engages the material and makes the cut of the desired vertical length upon the material. Once the cut is accomplished, the cutting tool can be de-energized, the carriage moved and locked into a position at the top of the linear guide to clear the cut material to be cut. The material to be cut be can be repositioned for another cut; removed and replace with different material to be cut or the like. At the substantial completion of this step, the process 300 can return to step 305 if additional operations is required.

In step 312 cross-cut type orientation, the assembly of the carriage and cutting tool can be introduced into or engaged by the linear guide to place the cutting tool in the proper horizontal orientation for the operation. If the carriage has been previously loaded into the linear guide but the cutting tool is not in the proper orientation (e.g., the plane of the saw blade is in a vertical orientation), the carriage can be removed (e.g., lifted up and out) from the linear guide assembly; partially rotated (e.g. ninety [90°] degrees) to place the plane of the saw into the proper horizontal orientation; and reinserted into the linear guide. As this step is substantially completed, the process 300 could proceed to step 314 cross-cut type operations.

In step 314, cross cutting operation, with the assembly of the carriage and cutting tool in place within the linear guide, the material to be cut can be loaded into the panel saw to be moved along the framework and on top of the sliding means. The assembly of the carriage and cutting tool could be moved along the linear guide and locked into place (e.g., desired height) with the guide securing means to set the height of the cut into the material to be cut. Once so positioned, the cutting tool can be energized to put the cutting portion in operation. The operator can move the material to be cut along the framework and the sliding means to engage the cutting portion with the material to be cut to make the desired cut of a desired length. Once material to be cut has generally moved through the framework to create the desired cut, the cutting tool is depowered. As needed, the assembly of the carriage and cutting tool can be unlocked and moved along the linear guide to be secured to a new position. The material to be cut can be repositioned for another cut; removed and replace with different material to be cut or the like. At the substantial completion of this step, the process 300 can return to step 305 if additional operations are required.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

As set forth in the specialization, claims and drawings, the invention provides a panel saw whose carriage can be easily detached from the linear guide to allow the rotation of carriage to change the orientation of action of the attached cutting tool relative to the linear guide and hence the material to cut that is loaded onto the invention. The easy carriage removal further allows for quick and easy replacement of first carriage with a second carriage featuring an attachment setup for a tool type that is different from the tool type supported by the first carriage.

I claim:

1. A method of operating a vertical panel saw comprising the following steps:
   (A) providing a vertical panel saw comprising: a framework supporting a set of railings, the set of railings are held in a parallel and spaced-apart orientation to one another and to the framework to create an cutting space located between and separating the railings apart and the railings are further beveled; a carriage having at least two pairs of opposing carriage side edges, at least one pair of the at least two pairs of opposing carriage side edges are beveled and removably engages the set of railings to movably locate the carriage between the set of railings to allow the carriage to move along the railings, the carriage further configured to removably receive a cutting tool, wherein a combination of the cutting tool and the carriage moves in and out of contact with the set of railings through a pair of openings, wherein each railing of the set of railings comprises an outer railing bracket and an inner railing bracket, wherein said outer and inner railing brackets are two separate L-brackets fastened together to form a space for receiving the carriage, a length of the outer railing bracket is greater than a length of the inner railing bracket by a distance that is greater than a length of the carriage side edge to form one opening of the pair of openings, each opening from the pair of openings is located along a side of a respective railing to allow the one pair of the at least two pairs of carriage side edges to be moved out of contact with the set of railings while alternately allowing a remaining pair of opposing carriage side edges to removably engage the set of railings in a manner that lets the carriage move along the set of railings, a direction of a movement of the carriage along the set of railings being perpendicular to a direction of a movement of the carriage in or out of the set of railings, the carriage and set of railings being configured to provide an removable engagement of the at least one pair of beveled carriage side edges with the set of railings that allows the carriage to be self-centering within the set of railings, wherein the combination of the cutting tool and the carriage when in removable contact with the set of railings places a cutting portion of the cutting tool within the cutting space;
   (B) moving the one pair of beveled carriage side edges of the at least two pairs of opposing carriage side edges through the pair of openings;
   (C) engaging one pair of beveled carriage side edges of the at least two pairs of opposing carriage side edges with the set of railings wherein each engaging beveled carriage side edge has a beveled portion that contacts a respective beveled portion of a respective railing of the set of railings permitting the carriage to be self-centering within the set of railings.

2. The method of claim 1 further comprises removably attaching the cutting tool to the carriage.

3. The method of claim 2 further comprises a step of subsequently removing the cutting tool from the carriage, the step of subsequently removing the cutting tool furthering comprising a step of using the cutting tool in a manner that is different from a use of the cutting tool as provided by the panel saw.

4. The method of claim 1 wherein the engaging the one pair of beveled carriage side edges further comprises a step of self-centering the carriage relative to the set of railings.

5. The method of claim 1 wherein the engaging the one pair of beveled carriage side edges further comprises a step of moving the carriage in a direction that is parallel to the movement of the carriage along the set of railings.

6. The method of claim 1 further comprising a step of moving the carriage along the set of railings further comprises a step of maintaining the self-centering of the carriage relative to the set of railings by maintaining contact of a beveled portion of one railing with a respective beveled portion of a respective opposing carriage side edge.

7. The method of claim 1 further comprises a step of disengaging the one pair of beveled carriage side edges from the set of railings, the step of disengaging further comprises a step of moving the carriage in a direction that is perpendicular to the movement of the carriage along the set of railings, the step of disengaging being subsequent to step (C).

8. The method of claim 7 wherein the step of disengaging further comprises a step of removing the beveled portion of a respective opposing carriage side edge from contact with the beveled portion of one railing.

9. The method of claim 8 further comprising a subsequent step of rotating a cutting edge of the cutting tool relative to the beveled set of railings by an angle of 90°.

10. The method of claim 9 wherein the step of again self-centering the carriage further comprises a step of re-contacting the beveled portion of the one railing with the respective beveled portion of a respective opposing carriage side edge.

11. The method of claim 10 further comprising a step of maintaining the self-centering of the carriage relative to the set of railings by maintaining contact of the beveled portion of railing with the respective beveled portion of a respective opposing carriage side edge as the carriage moves along the set of railings.

12. The method of claim 9 further comprising a subsequent step of re-engaging the carriage relative to the set of railings, the subsequent step of re-engaging the carriage further comprises a step of again self-centering the carriage upon the set of railings.

13. The method of claim 12 wherein the step of again self-centering the carriage further comprises a step of re-contacting the beveled portion of the one railing with the respective beveled portion of a respective opposing carriage side edge.

14. The method of claim 13 further comprising a step of maintaining the self-centering of the carriage relative to the set of railings by maintaining contact of the beveled portion of railing with the respective beveled portion of a respective opposing carriage side edge as the carriage moves along the set of railings.

15. The method of claim 7 wherein the step of disengaging further comprising a subsequent step of rotating the carriage relative to the beveled set of railings by an angle of 90°.

16. The method of claim 15 further comprising a subsequent step of re-engaging the carriage relative to the set of railings, the subsequent step of re-engaging the carriage further comprises a step of again self-centering the carriage upon the set of railings.

* * * * *